United States Patent
Chatterjee et al.

(10) Patent No.: US 8,245,078 B1
(45) Date of Patent: Aug. 14, 2012

(54) RECOVERY INTERFACE

(75) Inventors: Paresh Chatterjee, Fremont, CA (US); Narayanan Balakrishnan, Milpitas, CA (US); Anandh Mahalingam, Fremont, CA (US); Balasubramaniam Veeranna, Chennai (IN)

(73) Assignee: American Megatrends, Inc., Norcross, GA (US)

( * ) Notice: Subject to any disclaimer, the term of this patent is extended or adjusted under 35 U.S.C. 154(b) by 814 days.

(21) Appl. No.: 12/340,902

(22) Filed: Dec. 22, 2008

Related U.S. Application Data

(60) Provisional application No. 61/015,847, filed on Dec. 21, 2007.

(51) Int. Cl.
*G06F 11/00* (2006.01)

(52) U.S. Cl. ......... 714/20; 714/6.1; 714/6.11; 714/6.12; 714/6.2; 714/6.3; 714/15

(58) Field of Classification Search .................. 714/6.1, 714/6.11, 6.12, 6.2, 6.3, 15, 20; 715/762, 715/763
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Gooddlander et al. | |
| 5,720,027 A | 2/1998 | Sarkozy et al. | |
| 5,732,238 A | 3/1998 | Sarkozy | |
| 5,790,774 A | 8/1998 | Sarkozy | |
| 5,893,919 A | 4/1999 | Sarkozy et al. | |
| 6,098,128 A | 8/2000 | Velez-McCaskey et al. | |
| 6,463,501 B1 * | 10/2002 | Kern et al. | 711/100 |
| 7,328,366 B2 * | 2/2008 | Michelman | 714/6.3 |
| 7,418,619 B1 * | 8/2008 | Uhlmann et al. | 714/2 |
| 7,467,165 B2 * | 12/2008 | Okada et al. | 707/649 |
| 7,549,083 B2 * | 6/2009 | Eguchi et al. | 714/15 |
| 7,650,533 B1 * | 1/2010 | Saxena et al. | 714/6.12 |
| 7,711,712 B2 * | 5/2010 | Kano | 707/674 |
| 7,720,817 B2 * | 5/2010 | Stager et al. | 707/649 |
| 7,809,687 B2 * | 10/2010 | Cisler et al. | 707/654 |
| 7,814,367 B1 * | 10/2010 | Squibb et al. | 714/19 |
| 7,853,566 B2 * | 12/2010 | Cisler et al. | 707/654 |
| 7,856,424 B2 * | 12/2010 | Cisler et al. | 707/654 |
| 7,873,865 B2 * | 1/2011 | Okada et al. | 714/6.12 |
| 8,010,900 B2 * | 8/2011 | Hart et al. | 715/747 |

(Continued)

OTHER PUBLICATIONS

U.S. Appl. No. 12/173,203, filed Jul. 15, 2008, entitled "Data Recovery Point Review in a Continuous Data Protection System," Inventors: Chatterjee et al.

(Continued)

*Primary Examiner* — Christopher S. McCarthy
*Assistant Examiner* — Joshua P Lottich
(74) *Attorney, Agent, or Firm* — McKeon, Mennier, Carlin & Curfman, LLC

(57) ABSTRACT

A user interface is provided through which a user may specify a container for data recovery. In response to the specification of a container for recovery, another user interface is provided through which the user can select a consistency group or a journal file to be utilized for recovery. In response to receiving a selection of a journal file for data recovery, a user interface is provided through which a user may specify a point in time, an event, or a snapshot at which time recovery for the corresponding volume should occur. In response to receiving a selection of a consistency group for recovery, a user interface is provided through which a user may specify a snapshot performed across two or more volumes of the consistency group that should be utilized for recovery.

20 Claims, 20 Drawing Sheets

U.S. PATENT DOCUMENTS

| | | | |
|---|---|---|---|
| 8,024,292 B2* | 9/2011 | Thompson et al. | 707/640 |
| 2004/0139128 A1* | 7/2004 | Becker et al. | 707/204 |
| 2007/0220309 A1* | 9/2007 | Andre et al. | 714/6 |
| 2008/0034013 A1* | 2/2008 | Cisler et al. | 707/203 |
| 2008/0034019 A1* | 2/2008 | Cisler et al. | 707/204 |
| 2008/0034039 A1* | 2/2008 | Cisler et al. | 709/204 |
| 2008/0126441 A1* | 5/2008 | Giampaolo et al. | 707/204 |
| 2009/0070390 A1* | 3/2009 | Okada et al. | 707/202 |
| 2010/0115334 A1* | 5/2010 | Malleck et al. | 714/15 |
| 2010/0217857 A1* | 8/2010 | Blea et al. | 709/223 |
| 2011/0083098 A1* | 4/2011 | Cisler et al. | 715/784 |
| 2011/0087976 A1* | 4/2011 | Cisler et al. | 715/762 |

OTHER PUBLICATIONS

Mac OS X Leopard—Features—Time Machine., accessed Feb. 9, 2009 from http://www.apple.com/macosx/features/timemachine.htlm, 2 pages.

* cited by examiner

CONTINUOUS DATA TECHNOLOGY

TO LIST COMMON SNAPSHOTS BETWEEN A TIME FRAME, SELECT VOLUMES/CONSISTENCY GROUP FROM THE LIST BELOW.

○ SELECT VOLUME  ● SELECT CONSISTENCY GROUP

| | NAME | CAPACITY | TYPE |
|---|---|---|---|
| ☑ | NASCG | N/A | CONSISTENCY GROUP-SAR PAIR |
| ☐ | JFO | 1 GB | JOURNAL FILE |

SELECT DATE

FROM: 05/31/2007 (MM/DD/YYYY)

TO: 05/31/2007 (MM/DD/YYYY)

SELECT TIME

START TIME: [03 ▼] : [44 ▼] (HH:MM)

END TIME: [12 ▼] : [20 ▼] (HH:MM)

[<<BACK]  [NEXT>>]  [CANCEL]

*Fig. 2*

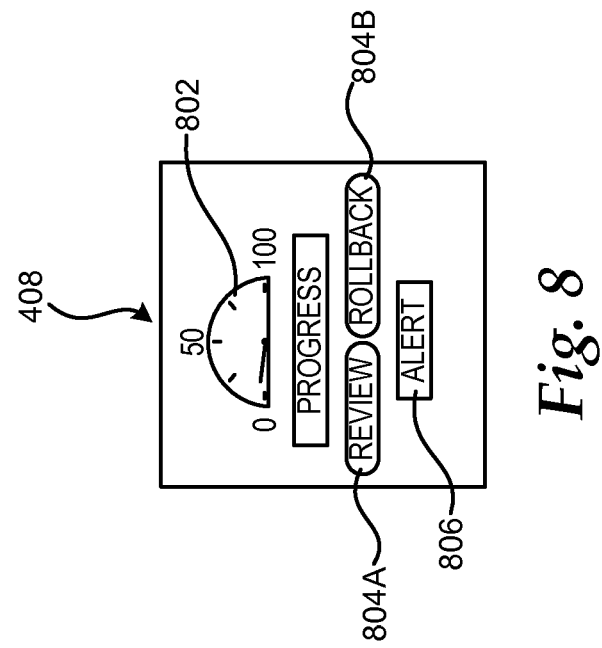
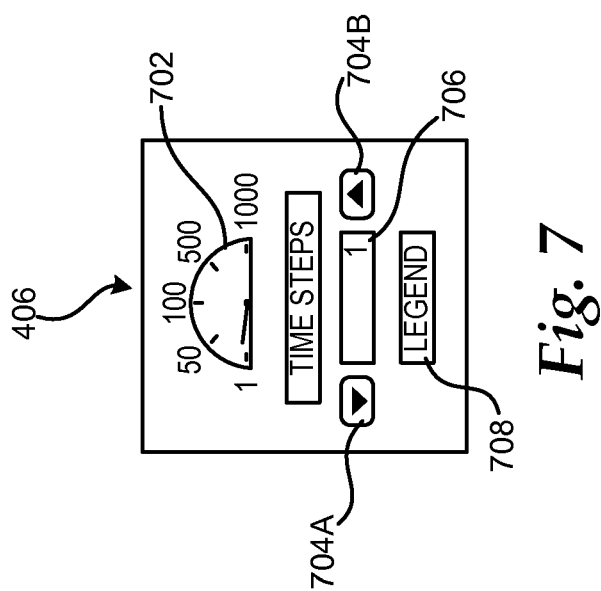

*Fig. 16*

RECOVERY INTERFACE

CROSS-REFERENCE TO RELATED APPLICATION

This application claims the benefit of U.S. provisional patent application No. 61/015,847, filed on Dec. 21, 2007, and entitled "User Interface for Logical Disaster Recovery," which is expressly incorporated herein by reference in its entirety.

BACKGROUND

Data storage and integrity are important components of information age business operations. Enterprises are increasingly moving toward data protection and disaster recovery strategies to prepare for, and recover from, data loss disasters. While some risks to stored data are physical and tangible (for example, failure of a disk drive, fire, or floods), other dangers are intangible or logical (for example, accidental deletion of files or an attack by a computer virus). Data may be protected from the first category of dangers through physical means, such as remote replication, redundant arrays of inexpensive disks ("RAID"), highly available systems, tape backups, and other mechanisms.

The second category of inadvertent erasure or modification of data is traditionally mitigated through other types of approaches. For example, different solutions may employ file versioning, storage system snapshots, tape backups, or periodic backup to a remote server. Many of these solutions are periodic, meaning that they may be executed once a day or even less frequently. As such, when data needs to be recovered, there is a potential for data loss as great as the amount of data created during the time period between two backups.

Requirements to protect against loss of data, along with various regulatory compliance requirements, are driving a move toward solutions involving Continuous Data Protection ("CDP"). According to the Storage Networking Industry Association's ("SNIA") CDP Special Interest Group, CDP is a "methodology that continuously captures or tracks data modifications and stores changes independently of the primary data, enabling recovery points from any point in the past. CDP systems may be block, file, or application-based and can provide fine granularities of restorable objects to infinitely variable recovery points." Such a definition implies three primary aspects to a CDP implementation: the ability to track and capture data; the ability to rollback to any point in the history of the volume; and the ability to store captured data in a location external to the main data.

At the time a CDP system is rolled back, a system operator generally considers the protected data in order to establish a recovery point. Generally, a desired recovery point is very close to the time of a data loss or storage disaster, yet strictly before the loss event so as to ensure data integrity. An operator may wish to perform a recovery review, stepping back and forth to different history points around the time of data loss. In a traditional CDP system, the operator is generally restricted to reviewing in only one direction. This direction is typically the backwards direction and if forward review is desired, the operator may have to recreate the copy of the volume and restart the review process. This procedure does not afford quick and efficient scanning backward and forward through the protected data to find the desired recovery point. As a result, a preferred recovery point for rolling back the volume may not be readily obtainable in a traditional CDP system.

It is with respect to these considerations and others that the disclosure made herein is presented.

SUMMARY

Concepts and technologies are described herein for providing a user interface for recovering the contents of a storage system, such as in response to the occurrence of a disaster that causes data loss. Through an implementation of the concepts and technologies presented herein, a recovery review can be quickly and easily performed. In particular, the point in time at which recovery should be performed may be graphically specified as a point in time, an event, or a snapshot. The particular point in time, event, or snapshot may be specified by graphically moving through time, events, and snapshots in a chronological manner.

According to one embodiment, a user interface for data recovery is provided for use in conjunction with a storage system that provides CDP functionality. The CDP functionality may be provided through a number of different mechanisms, including journaling and storage snapshots. Journaling refers to a process by which all input/output ("I/O") operations to an enabled storage volume are logged to a sequential journal volume. A snapshot is a read-only volume that is a point-in-time image of a data storage volume that can be created, mounted, deleted, and rolled back onto the data storage volume arbitrarily. Snapshots may be simultaneously taken across a set of volumes such as a consistency group.

According to one implementation, a user interface, referred to herein as the "storage pool management" user interface, is provided through which a user may specify a container for data recovery. A container is a group of logical drives operating together. In response to the specification of a container for recovery, another user interface is provided through which the user can select a consistency group or a journal file to be utilized for data recovery. A consistency group is a set of volumes for which all write I/Os within a given time period are treated collectively. A journal file is a file containing a log of all I/O operations.

In response to receiving a selection of a journal file for data recovery, a user interface, referred to herein as the "flashback" user interface, is provided. Through the flashback user interface, a user may specify a point in time, an event, or a snapshot the time of which at which recovery for the corresponding volume should occur. In one embodiment, the flashback user interface provides two views: a log view and an event view. The log view includes user interface controls for graphically representing the time at which events in the journal file occurred and for allowing a user to select the time of one of the events as the time at which recovery should occur.

According to embodiments, the log view is further configured to graphically represent the time at which one or more snapshots identified in the journal file occurred and for allowing a user to select the time of one of the snapshots as the time at which recovery should occur. The time at which recovery should be performed may also be selected in discrete time units. According to one embodiment, a user interface control is provided through which a user may change the time, event, or snapshot at which time recovery should occur in discrete time units. A user interface control may also be provided for defining the discrete time units.

The log view may also include a user interface control for receiving a request to perform recovery at the specified time, event, or snapshot. In response to receiving such a request, the user interface presented herein is configured to transmit a request to a storage system to perform the data recovery at the specified point. A graphical representation of the progress of the recovery operation may also be provided.

According to other embodiments, the event view of the flashback user interface includes a user interface for specifying the time of an event as the time at which recovery should occur. For instance, a time-ordered list of events may be displayed. The user may be permitted to scroll through the events and to select one of the events to identify the point in time at which recovery should occur. Events may include snapshots, application events, and operating system events. The event view may also include a user interface control for receiving a request to perform recovery at the time of the specified event.

In response to receiving a selection of a consistency group for recovery, a user interface, referred to herein as the "retrospect" user interface, is provided. The retrospect user interface provides a user interface through which a user may specify a snapshot performed across two or more volumes of the consistency group that should be utilized for recovery. The retrospect user interface includes a graphical representation of each of the available snapshots for the consistency group. In one implementation, the graphical representations are sized according to the time at which the corresponding snapshot was created. Each graphical representation is selectable to specify the time of a corresponding snapshot for recovery. User interface controls may be provided for scrolling through the available snapshots. The snapshots may be animated to graphically indicate the point in time at which they were taken.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2-3 and 16 are user interface diagrams showing illustrative user interfaces for selecting a journal file or a consistency group in one embodiment;

FIGS. 4-11 and 14-15 are user interface diagrams showing a log view of a user interface for specifying a point in time, an event, or a snapshot that defines the time at which recovery of a storage volume should occur;

DETAILED DESCRIPTION

Figure 1:
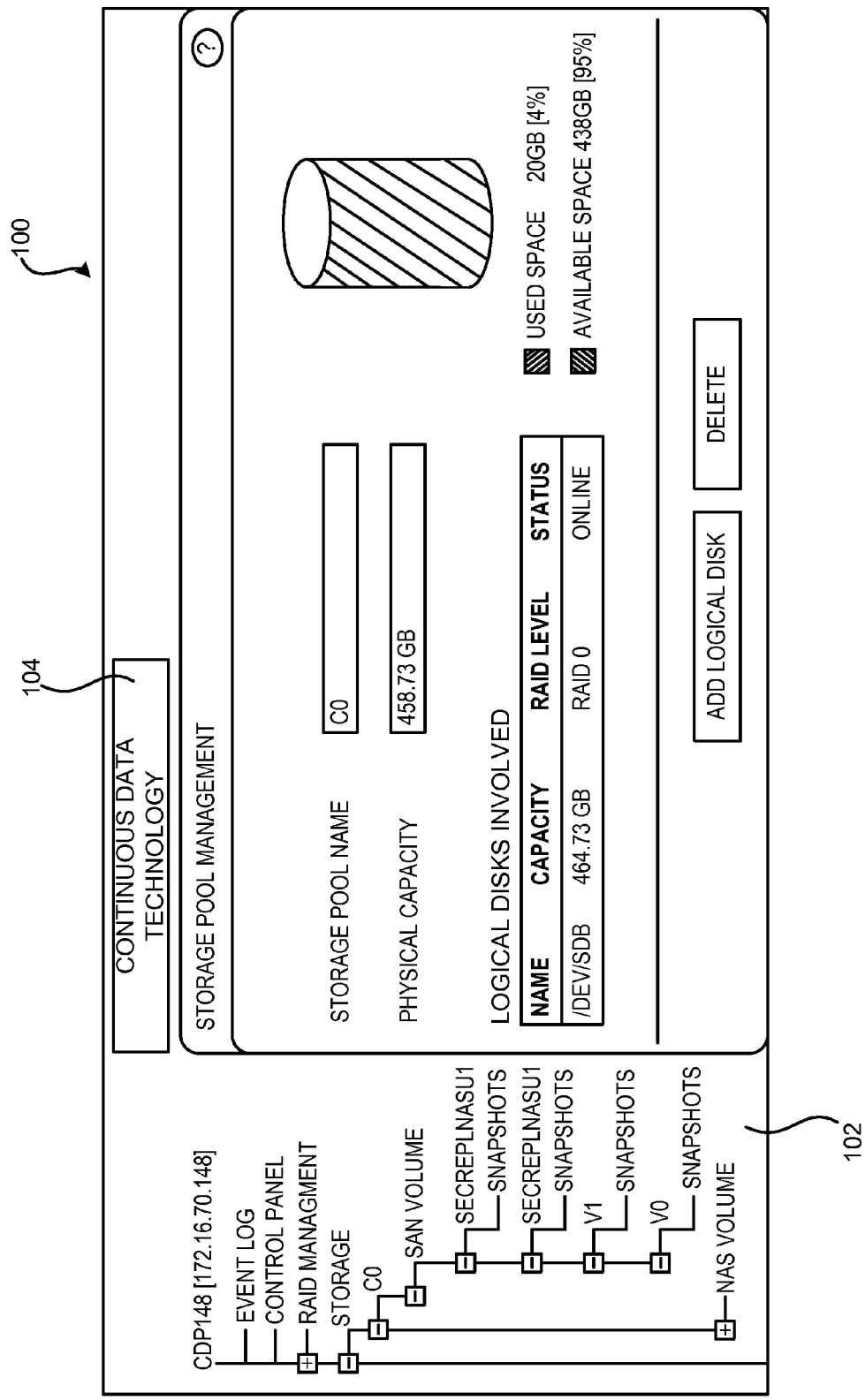
FIG. 1 is a user interface diagram showing an illustrative user interface for selecting a storage container utilized in one embodiment presented herein.

The following detailed description is directed to technologies for data recovery. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

As discussed briefly above, the embodiments presented herein include user interfaces for data recovery, including logical disaster recovery. The user interfaces described herein operate in conjunction with a storage system capable of providing CDP. For instance, in one implementation, the user interfaces presented herein operate in conjunction with a computing system capable of providing CDP through the use of a journaling module.

The journaling module utilized in embodiments presented herein provides time addressable storage ("TAS") as well as event addressable storage ("EAS"). In order to provide this functionality, the journaling module logs all I/O operations to an enabled storage volume to a sequential journal volume. This logging can occur in parallel to the I/O operation, thereby having little, or no, impact on the performance of the storage system. Previous data need not be backed up; instead only new I/O operations may be recorded in a journal file (which might be referred to herein as the "journal"), or log, stored on the journal volume.

According to another aspect, the journaling module might also record snapshot events to the journal. When a snapshot of a storage volume is created, that occurrence of the snapshot may be recorded in the journal along with other I/O operations.

When data stored on a volume needs to be recovered, a writable snapshot taken prior to the desired recovery point can be mounted. The I/O operations occurring after the creation of the snapshot, but prior to the desired recovery point, can be played back onto the snapshot. Using an efficient snapshot technology, the recovery time from mounting the previous snapshot and playing back the operations from the journal may be extremely fast. Such a system can provide excellent recovery point objective ("RPO") performance as well as excellent recovery time objective ("RTO") performance. This performance may reduce the cost associated with downtime and can provide considerable improvement over traditional CDP approaches. Additional details regarding such a journaling module can be found in U.S. patent application Ser. No. 12/173,188, filed on Jul. 15, 2008, and entitled "Continuous Data Protection Journaling in Data Storage Systems", which is expressly incorporated by reference herein in its entirety. It should be appreciated that any volume that has been enabled for journaling in the manner described above may be utilized with the user interface provided herein.

It should be appreciated that embodiments presented herein may also be utilized with storage systems configured to organize two or more volumes into a single consistency group. A consistency group is a set of volumes for which all write I/Os within a given time period are treated collectively. For instance, when multiple volumes are grouped together into a single consistency group, all write I/Os to the volumes will be treated collectively. As a result, the write I/Os pertaining to the related volumes will be kept in the same bucket. The bucket meta-data may include information to identify the volume that a particular zone of an I/O belongs to.

It should be appreciated that consistency groups further enhance application-aware consistency points, such that the consistency is now maintained across all the volumes of the consistency group. Furthermore, events such as snapshots may be maintained across all of the volumes of a consistency group, thereby providing complete application-aware point in time snapshots. Additional details regarding the use and implementation of consistency groups can be found in U.S. patent application Ser. No. 11/695,854, filed on Apr. 3, 2007, and entitled "Asynchronous Data Replication", which is expressly incorporated by reference herein in its entirety.

The embodiments presented herein may also be utilized with storage systems that provide functionality for structuring a virtualized cluster as one or more containers. A container is a group of logical drives operating together. Additional details regarding the use, implementation, and management of containers can be found in U.S. patent application Ser. No. 12/104,135, filed on Apr. 16, 2008, and entitled "Container Space Management in a Data Storage System", which is expressly incorporated by reference herein in its entirety.

The embodiments presented herein may also be utilized with a storage system capable of performing snapshots. A snapshot is a read-only volume that is a point-in-time image of a data storage volume that can be created, mounted, deleted, and rolled back onto the original data storage volume arbitrarily. Snapshots are utilized extensively for security, backup, and archival purposes. One mechanism for implementing storage snapshots is described in U.S. Pat. No. 7,373,366, issued on May 13, 2008, and entitled "Method, System, Apparatus, and Computer-Readable Medium for Taking and Managing Snapshots of a Storage Volume", which is expressly incorporated herein by reference in its entirety. It should be appreciated that the illustrative storage system illustrated in FIGS. 21-22 and discussed below may support the functionality described above for journaling, snapshots, containers, consistency groups, and others.

In the following discussion, references are made to the accompanying drawings that form a part hereof, and which are shown by way of illustration specific embodiments or examples. Referring now to the drawings, in which like numerals represent like elements through the several figures, aspects of a computing system and methodology for providing a user interface for data recovery in a CDP system will be described.

As discussed briefly above, the embodiments presented herein are utilized in conjunction with a storage system that supports CDP through a journaling module. As a result, all volumes and volume groups that have been enabled for journaling will be available for CDP and for use with the user interfaces presented herein. Additionally, the user interfaces presented herein provide a mechanism to consistently review and recover volumes of a consistency group. For storage area network ("SAN") volumes or volume groups that are not enabled for journaling, the user interfaces presented herein provide a mechanism to group these volumes together logically during the recovery process and to recovery data across all the volumes together.

In order to access the user interfaces provided herein for data recovery, a user may first select a container for recovery. FIG. 1 shows one illustrative user interface 100 for selecting a container. The storage pool management user interface 100 shown in FIG. 1 includes a tree 102 through which a user may select a desired container for data recovery. Details regarding the selected container, such as the name, physical capacity, used space, available space, and the logical discs associated with the container may be displayed in the user interface 100. The user interface 100 may also include additional functionality for adding additional logical discs or deleting a logical disc.

In order to access the functionality provided herein for data recovery, a user may select the user interface button 104. It should be appreciated that the user interface illustrated in FIG. 1 is merely illustrative and that other types of user interfaces may be provided for allowing a user to select a container for data recovery. It should also be appreciated that a user may interact with the user interfaces as described herein using any suitable user input mechanism, such as a mouse, keyboard, touch screen, or digitizer tablet.

In response to receiving the selection of a container for data recovery and the button 104 shown in FIG. 1, the user is presented with the user interface 200 shown in FIG. 2. The CDP control user interface 200 shown in FIG. 2 provides a user interface through which a user may specify a consistency group or a journal file to be used for recovery. The user may also select individual volumes for recovery utilizing the user interface 200.

The user interface 200 also provides user interface controls for allowing a user to specify the time period during which the recovery may be performed. In one embodiment, a default start time is set as the time of creation of the container or volume and the end time is set at the current time. As will be described in detail below, the time period can be modified utilizing the user interface controls provided by the user interface 200.

As shown in FIG. 2, the user interface 200 includes user interface controls 202A-202B for selecting a volume or a consistency group, respectively. In response to selecting one of the user interface controls 202A-202B, the volumes or consistency groups associated with the container selected utilizing the user interface 100 are displayed in the pane 204. An appropriate user interface control, such as a check box, may then be selected to specify the consistency group or journal that should be utilized for data recovery. In the example shown in FIG. 2, the consistency group named "NASCG" has been selected.

As discussed briefly above, the user interface 200 also provides a date/time selection pane 206 through which a user may specify the time period during which data should be recovered. As will be described in detail below, the selected time period is utilized to display events and/or snapshots taken during the time period, and to allow a user to select one of these occurrences as the time at which data recovery should occur. Additionally, controls are provided for fine tuning the time at which data recovery should be performed.

Figure 17:
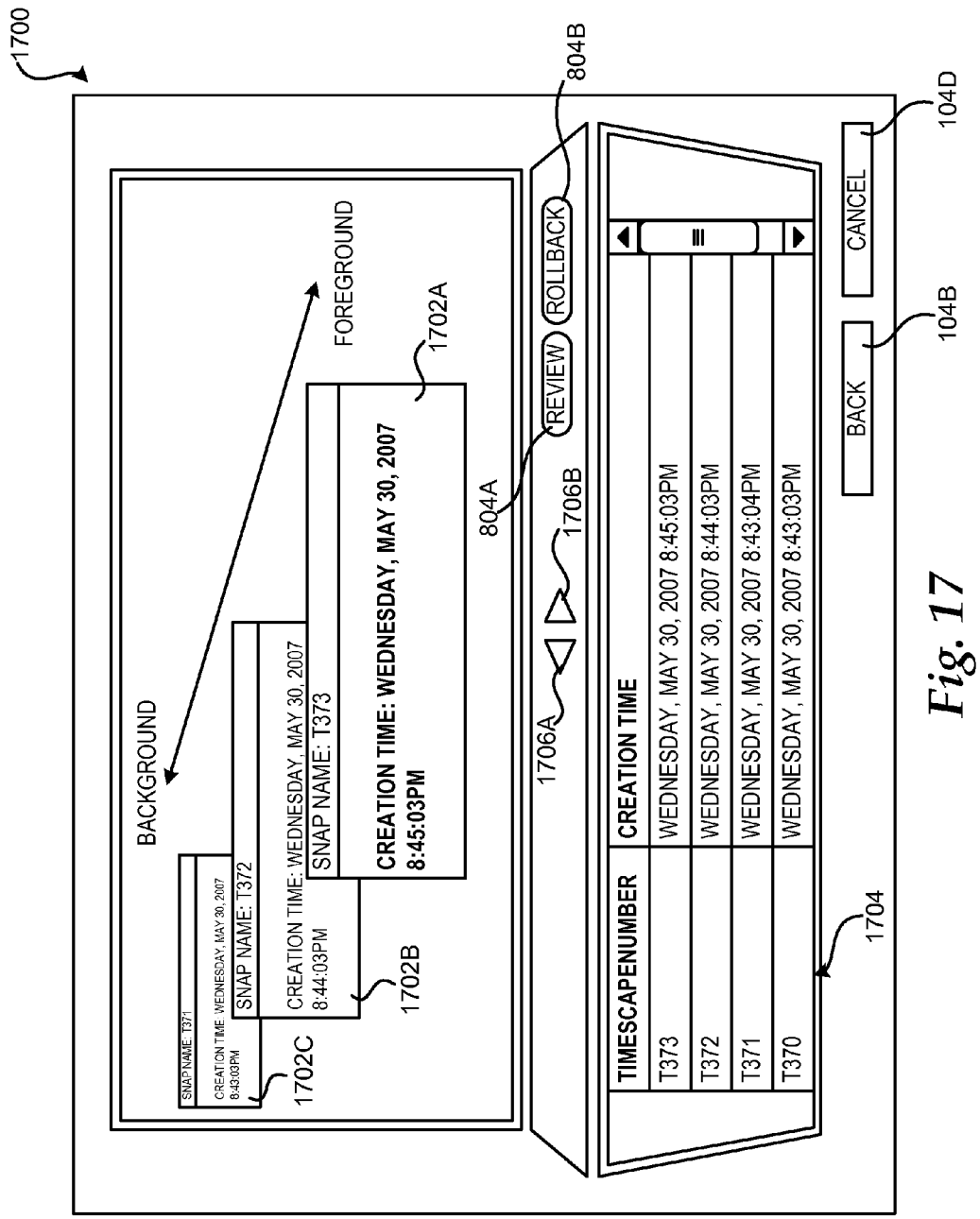
FIGS. 17-19 are user interface diagrams showing a user interface through which a user may specify a snapshot that should be utilized for data recovery.
Figure 18:
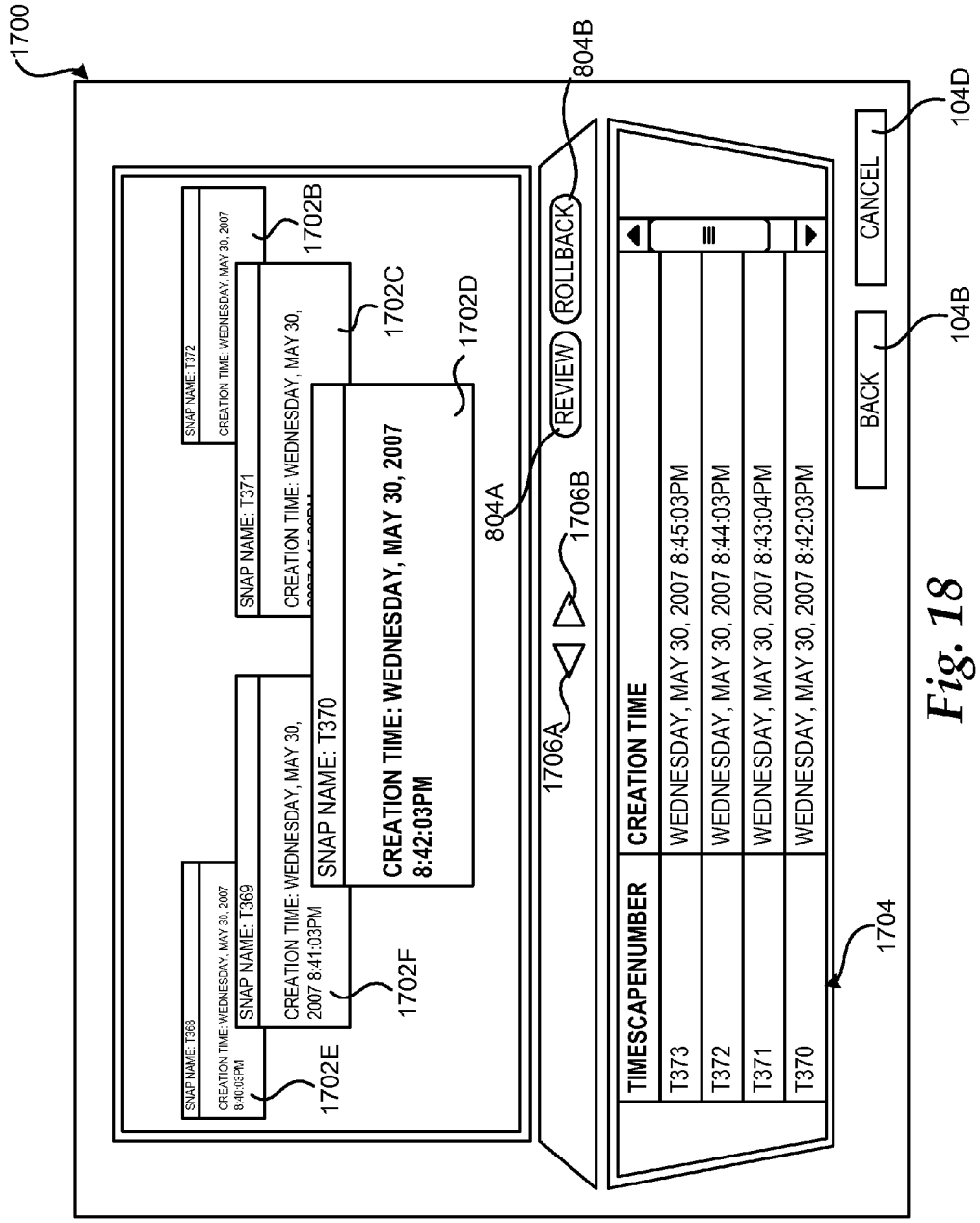
Figure 19:
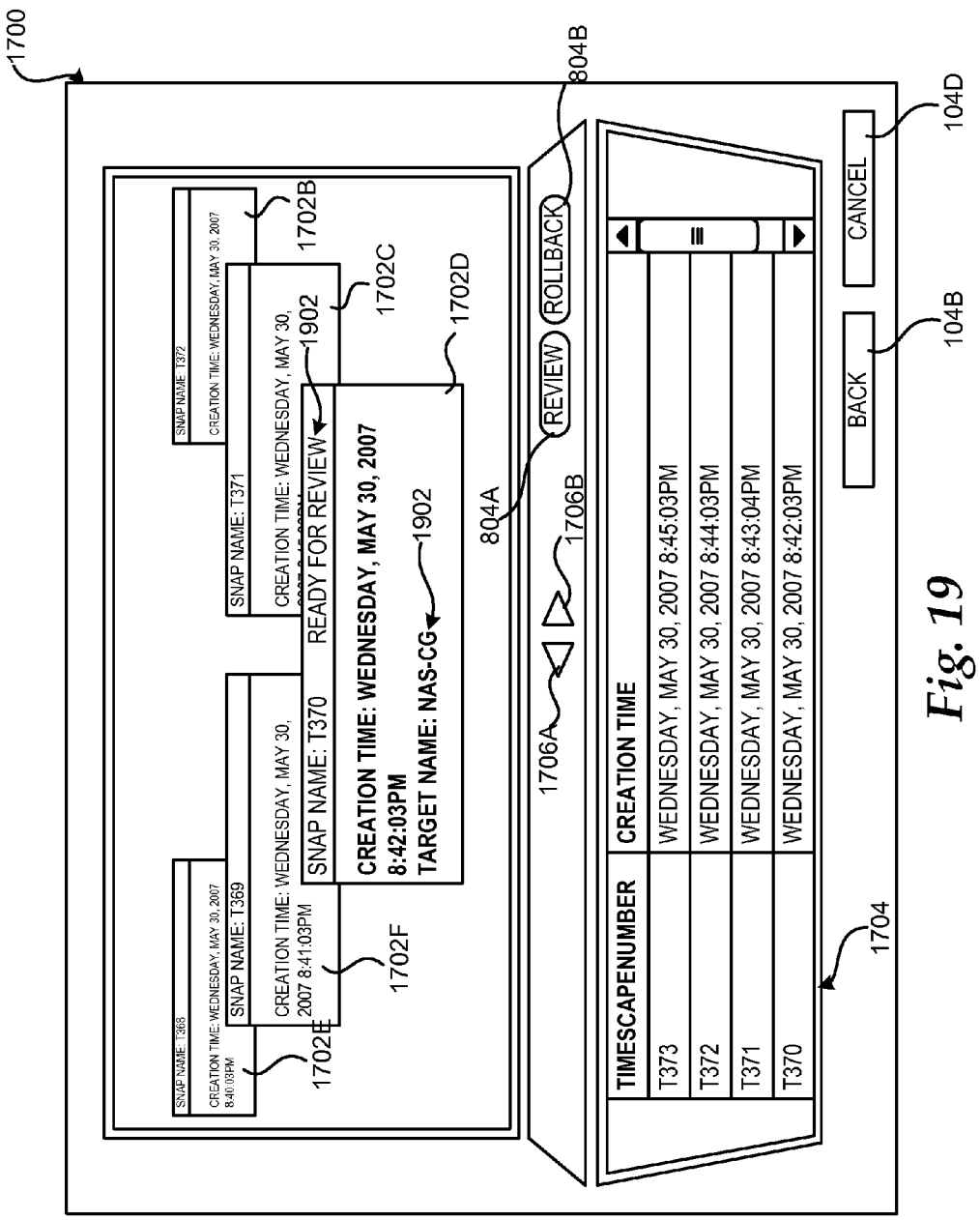

As shown in FIG. 2, the user interface 200 further includes the user interface buttons 104B-104D. Selection of the user interface button 104B will return the display to the user interface illustrated in FIG. 1. Selection of the user interface button 104D will cause the data recovery operation to be canceled. Selection of the user interface 104C will cause another interface to be displayed for data recovery. The type of user interface that is displayed in response to the selection of the user interface button 104C depends upon whether a consistency group or a journal file has been selected for data recovery. If a journal file is chosen through the user interface 200, and journal data is available during the time period specified through the date/time selection pane 206, the user interface described below with respect to FIGS. 4-15 is provided. If a consistency group is selected, then the user interface described below with respect to FIGS. 17-19 is provided. Additional details regarding both of these user interfaces will be provided below with respect to these figures.

Figure 3:
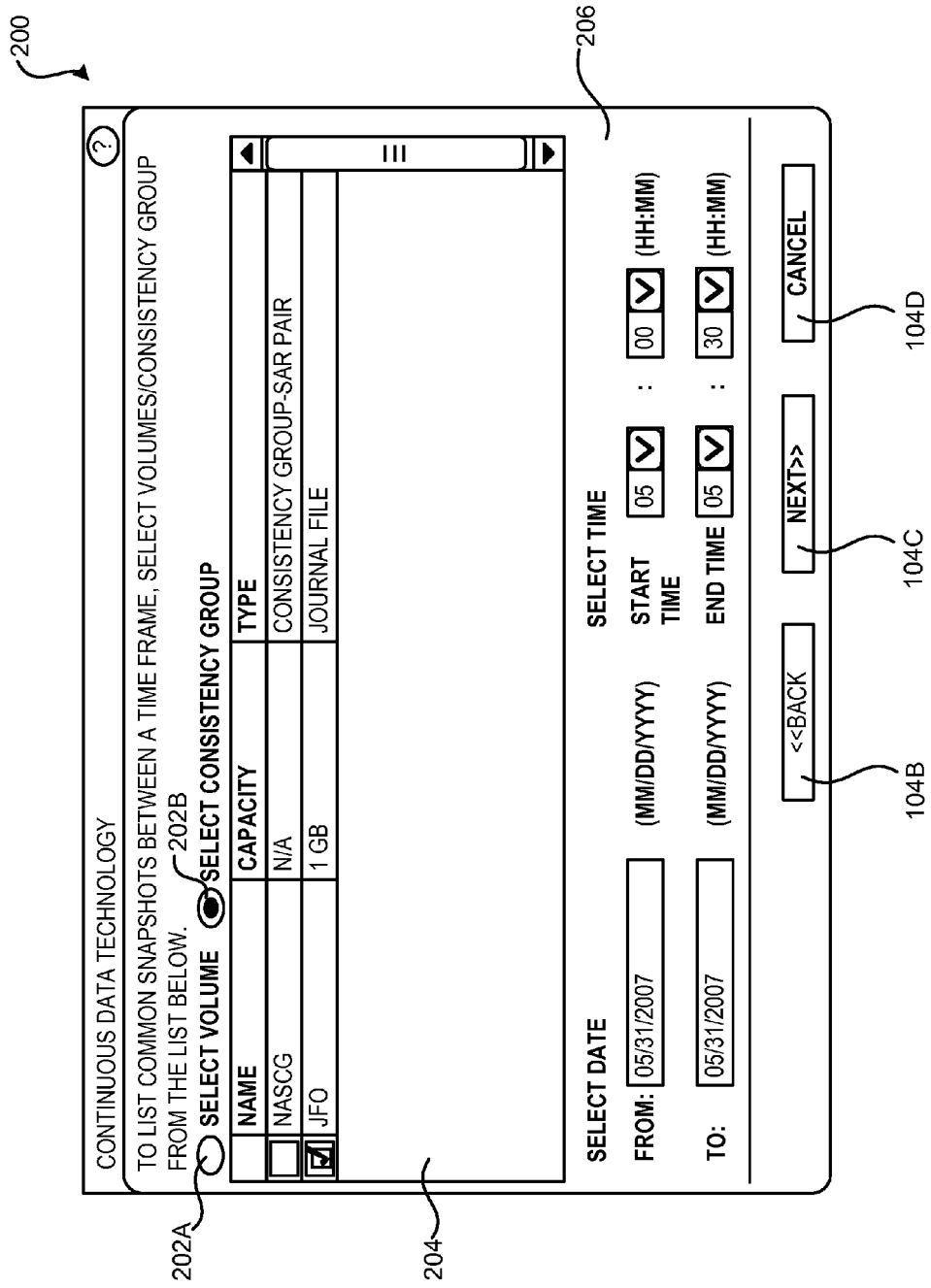

In the example user interface 200 shown in FIG. 3, a user has selected the journal file named "JOF". The user has also selected a time period between 5:00 and 5:30 on May 31, 2007 using the date/time selection pane 206. If the user then selects the user interface button 104C, the user will be presented with the user interface 400 shown in FIG. 4.

Figure 4:
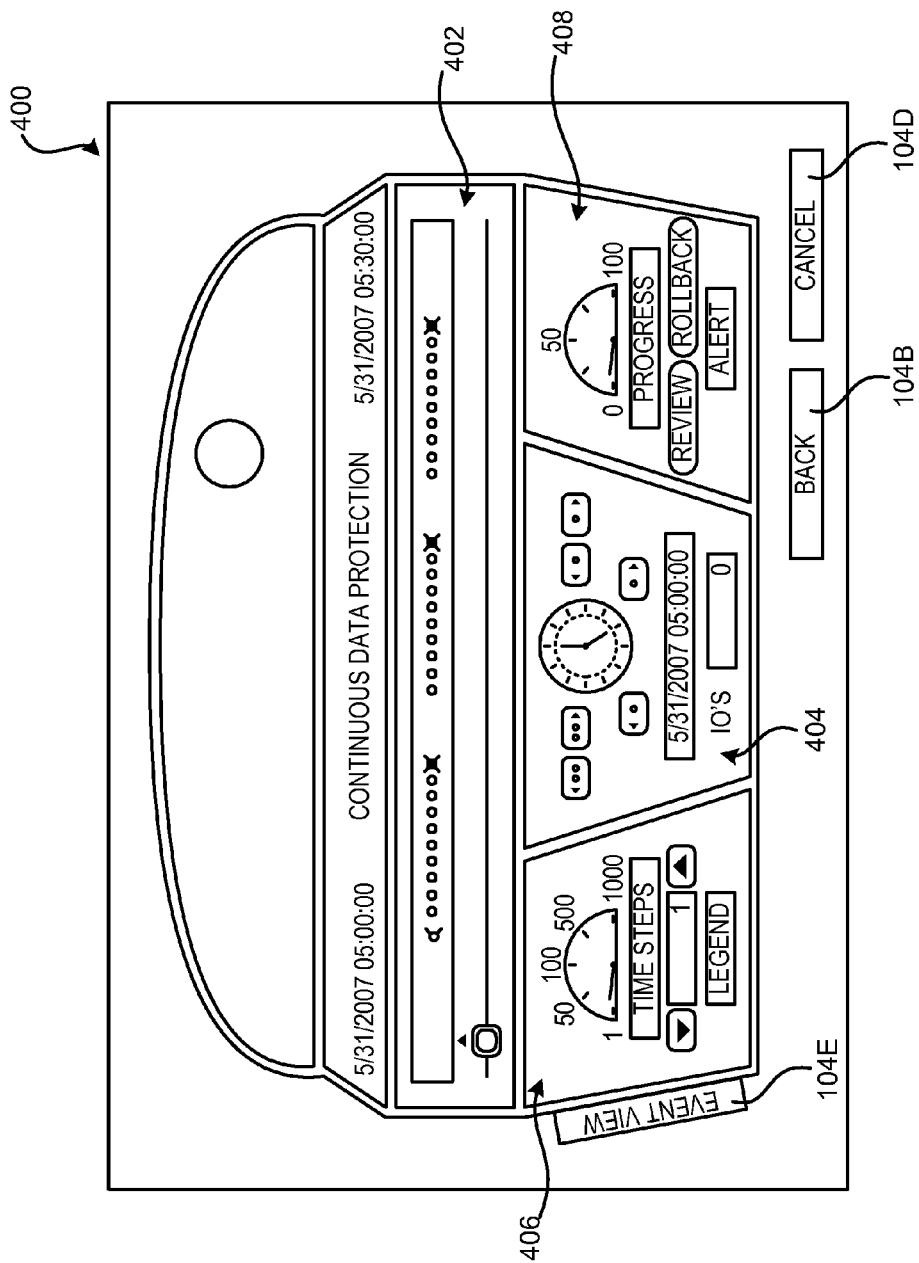

FIG. 4 shows a "flashback" user interface 400 provided in one embodiment herein for specifying a point in time, event, or snapshot, the time of which recovery for the selected volume should occur. More particularly, the user interface shown in FIG. 4 shows a "log view" of the user interface 400. As will be described in greater detail below with respect to FIGS. 12-13, the user interface 400 also provides an "event view".

As will be described in greater detail below, the user interface 400 allows a user to choose a point or event in time, review the data at the selected point or event in time, and to roll the selected volume back to the selected point or event in time. The user interface 400 also allows a user to control the review at the I/O level. The event view discussed below with reference to FIGS. 12-13 allows the user to choose an appropriate event to review and restore. Both the log view and the event view provide a representation of the time at which a selected event or snapshot occurred by indicating the time of day graphically. Additionally, the user interface 400 allows a user to freely review both in the forward and backward directions.

As illustrated in FIG. 4, the user interface 400 in one embodiment is subdivided into four different panels. In particular, a time slider panel 402 is provided that illustrates graphically the events and snapshots that have been journaled. A time step control panel 406 is provided through which a user can specify the time step that is utilized by the time slider panel 402. A main control panel 404 is provided through which a user can move forward and backward in time based upon events, snapshots, or the time steps specified utilizing the time step control panel 406. A progress and review panel 408 is also provided through which a user can request to review the volume at the point in time selected using the time slider panel 402 or to roll back the selected volume to the point in time selected using the time slider panel 402. Additional details regarding the panels 402-408 will be provided below.

As shown in FIG. 4, a user interface button 104E is also provided which, when selected, will cause the user interface 400 to switch to the event view that is described below with respect to FIGS. 12-13. A user interface button 104B is also provided which, when selected, will return the display to the user interface 200 shown in FIG. 2. A user interface button 104D is also provided which, when selected, will cancel the data recovery operation.

Figure 5:
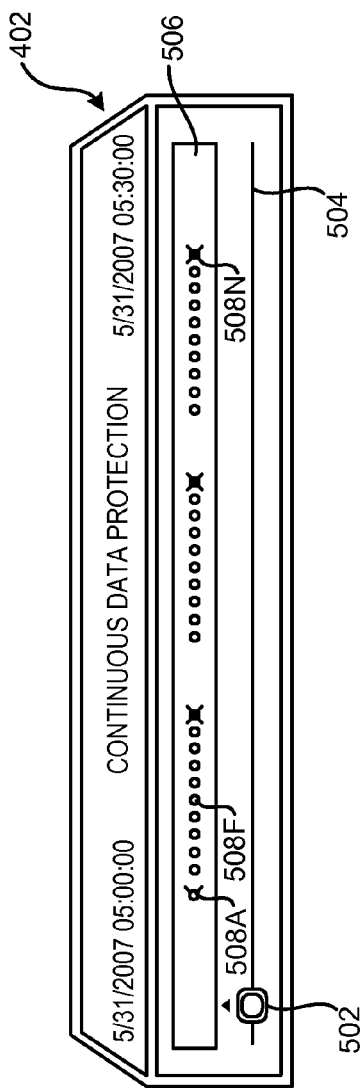

Referring now to FIG. 5, additional details regarding the time slider panel 402 will be provided. As shown in FIG. 5, the time slider panel 402 includes a slider control 502 that can be dragged utilizing an appropriate user input device to any point on the line 504. The line 504 corresponds to the context shown in events/snapshot display 506. In the event/snapshot display, events and snapshots taken on the selected volume are displayed chronologically and in a graphical manner. For instance, in the embodiment shown in FIG. 5, events and snapshots are represented by the indicators 508A-508N. In one particular embodiment, the indicators 508A-508N may be color coded in order to indicate whether the corresponding occurrence was an event or a snapshot. Additionally, portions of the event/snapshot display 506 may be colored in order to indicate the presence or absence of journal data.

It should be appreciated that the slider control 502 corresponds to the events and snapshots indicated in the event/snapshot display 506. The slider control 504 can be moved to any given time at which data needs to be restored. The main control panel 404 may be utilized to precisely control the recovery time.

Figure 6:
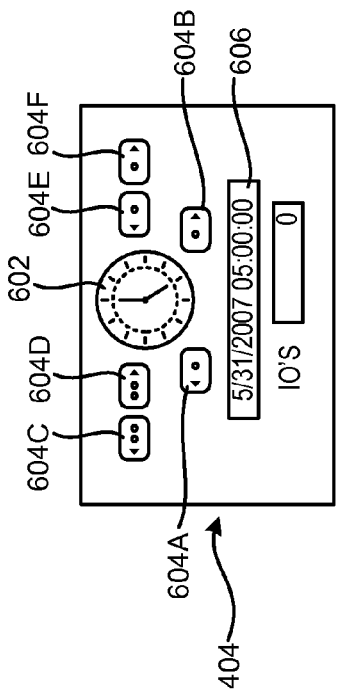

Referring now to FIG. 6, additional details will be provided regarding the operation of the main control panel 404. As discussed briefly above, the main control panel 404 may be utilized to precisely control the recovery time. When selections are made within the main control panel 404, the slider control 502 is moved to a corresponding position on the event/snapshot display 506. In particular, the main control panel 404 includes an analog clock display 602 and a digital clock display 606 indicating the time corresponding to the location of the slider control 502. Additionally, the main control panel 404 includes a number of user interface controls for specifically modifying the location of the slider control 502. In particular, the controls 604A-604B may be selected to move the slider control 502 in discrete time increments. In one embodiment, a default time increment of one second is specified. The time increment may be changed using the time step control panel 406, which is described in greater detail below with respect to FIG. 7. Additionally, a number of I/O operations to be performed can also be specified in the main control panel 404.

In one embodiment, the main control panel 404 also includes the controls 604C-604D for discretely moving the slider control 502 between the events displayed in the event/snapshot display. In this manner, the slider control 502 can be discretely moved between events, rather than using time steps. The controls 604E-604F are provided to discretely move the slider control 502 between snapshot events represented in the event/snapshot display 506. It should be appreciated that the main control panel 404 provides great flexibility for modifying the location of the slider control 502 to particularly select the time at which data recovery should occur.

Referring now to FIG. 7, additional details regarding the time step control panel 406 will be described. As discussed briefly above, the time step control panel 406 includes user interface controls for changing the discrete time units at which the slider control 502 is moved. In one implementation, the time step control panel 406 includes a graphical display 702 of the current time step setting. User interface buttons 704A-704B are also provided for decreasing or increasing the time step value, respectively. A text field 706 shows the currently selected time step value. A user interface button 708 is also provided for displaying a legend.

Turning now to FIG. 8, additional details will be provided regarding the progress and review panel 408. In one implementation, the progress and review panel 408 includes user interface buttons 804A and 804B. When selected, the user interface button 804A will cause the storage system to provide a writeable image of the volume at the time specified by the time slider panel 402. The review process does not modify the original volume, but rather provides a writable image that may be utilized to ensure that the specified data recovery will be performed in the desired manner. If the user interface button 804B is selected, an actual rollback operation will occur on the data volume. A progress gauge 802 is provided to show the progress of the review and rollback operations. An alert indicator 806 may also be provided to notify the user that a problem occurred with a review or rollback operation. It should be appreciated that the review and rollback operations occur at the time specified by the time slider panel 402 or the main control panel 404.

Figure 9:
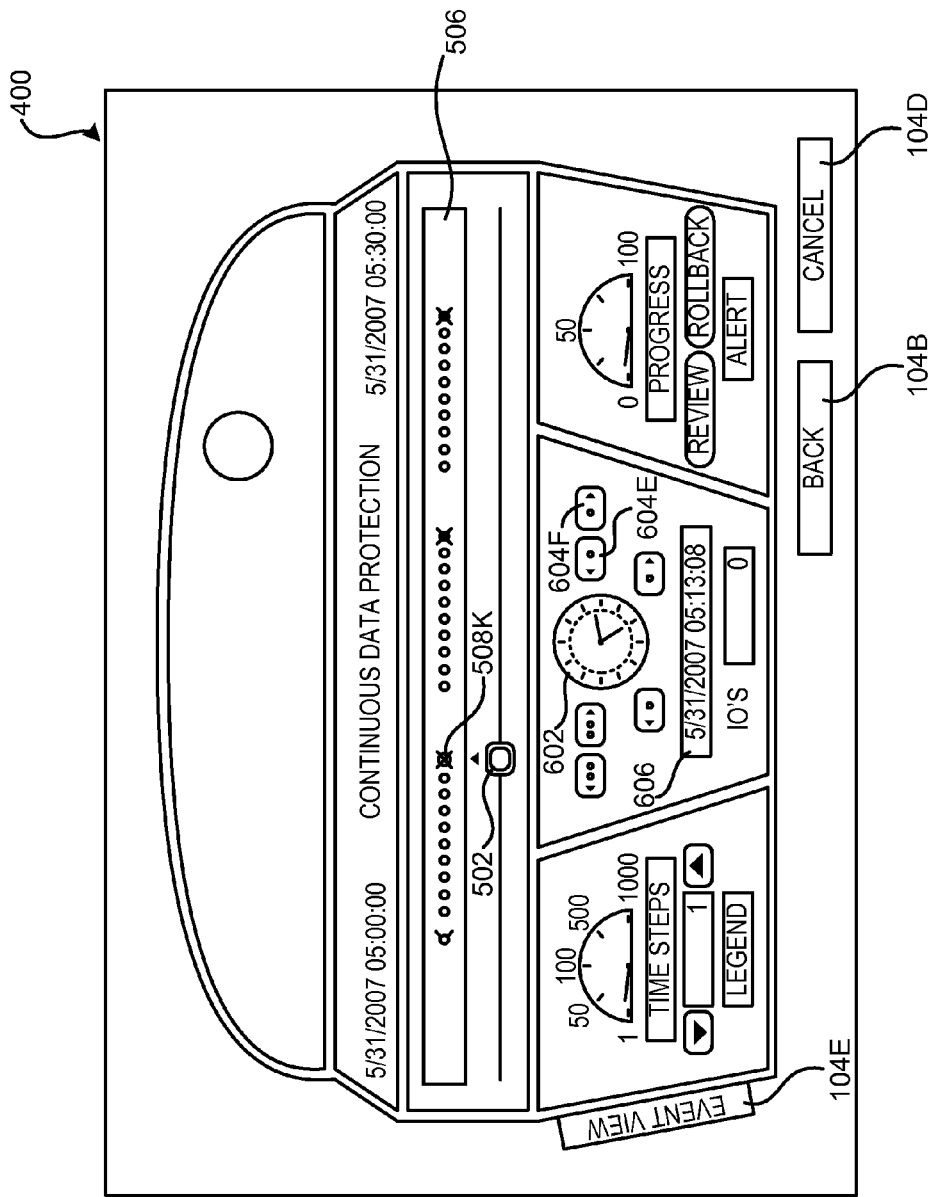

As discussed briefly above, the controls 604E-604F may be utilized to move the slider control 502 forward and backward to snapshots specified in the event/snapshot display. FIG. 9 illustrates this process. In the example shown in FIG. 9, the control 604F has been selected in order to advance the slider control 502 to the indicator 508K, which corresponds to a snapshot event. Additionally, it should be appreciated that through the advancement of the slider control 502, the clock displays 602 and 606 have been modified in order to show the time corresponding to the location of the slider control 502.

Figure 10:
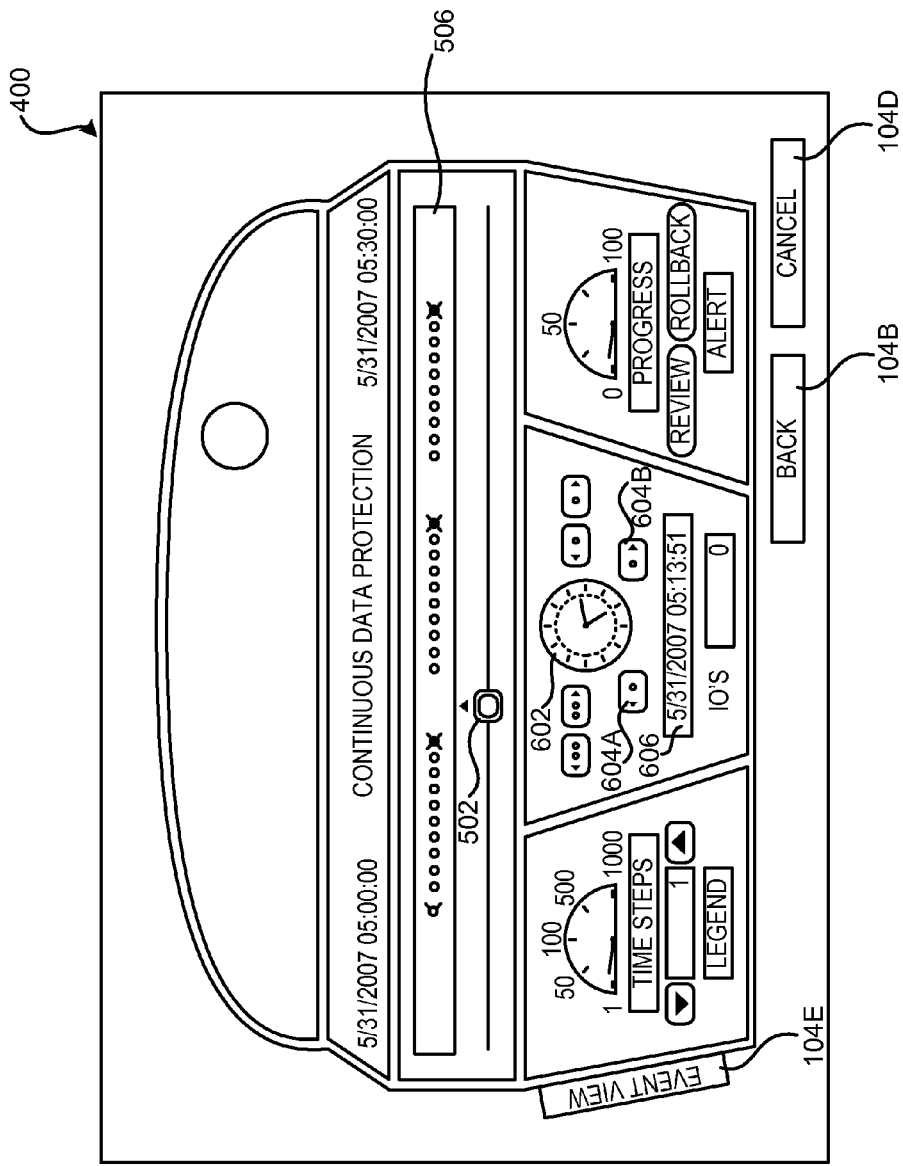

In the example shown in FIG. 10, the controls 604A-604B have been utilized in order to perform time-based movement of the slider control 502. As discussed above, the movement of the slider control 502 in this regard is performed according to the time steps specified through the time step control panel 406. In the example shown in FIG. 10, the slider control 502 has been advanced to a point in time shown by the clock displays 602 and 606. It should be appreciated that through the use of the control 604A-604B a user may move the slider control 502 in discrete time units not connected to any event or snapshot.

Figure 11:
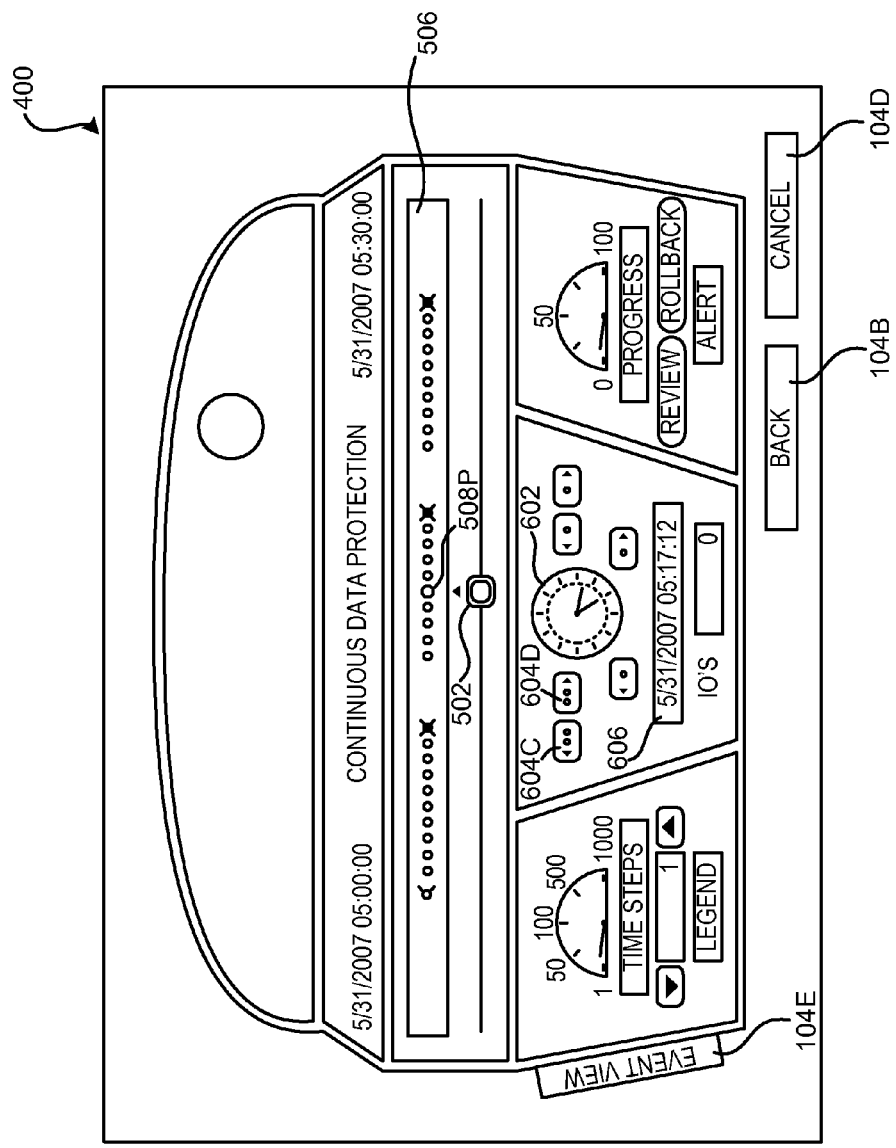

In the example shown in FIG. 11, a user has utilized the control 604C-604D to advance the slider control 502 to the indicator 508P. As discussed above, the controls 604C-604D allow a user to move the slider control 502 discretely between events. In the example shown in FIG. 11, the indicator 508P corresponds to an event. For instance, an event may include a snapshot, an application event, or an operating system event. As illustrated in FIG. 11, the clock displays 602 and 606 have been updated to indicate the current position of the slider control 502.

As discussed above, the flashback user interface 400 includes an alternative view, referred to herein as the event view. Selection of the button 104E will cause the user interface 400 to switch to this view. For instance, if a user selects the user interface button 104E shown in FIG. 11, the user interface 400 shown in FIG. 12 will be displayed.

As discussed briefly above, the event view provided by the user interface 400 includes an event list 1202 identifying the events specified in the journal within the selected time period. As also discussed above, events may include snapshots, application events, and operating system events. For instance, application events may include modifications performed when an application accesses a database. For example, an event occurs when an application, such as a database management application performs a checksum operation or a transaction. Operating system events may be retrieved from an operating system log to enable the user to correlate events in the user interface 400. Selecting any event in the list 1202 will provide information regarding the process that resulted in the occurrence of the event.

Figure 12:
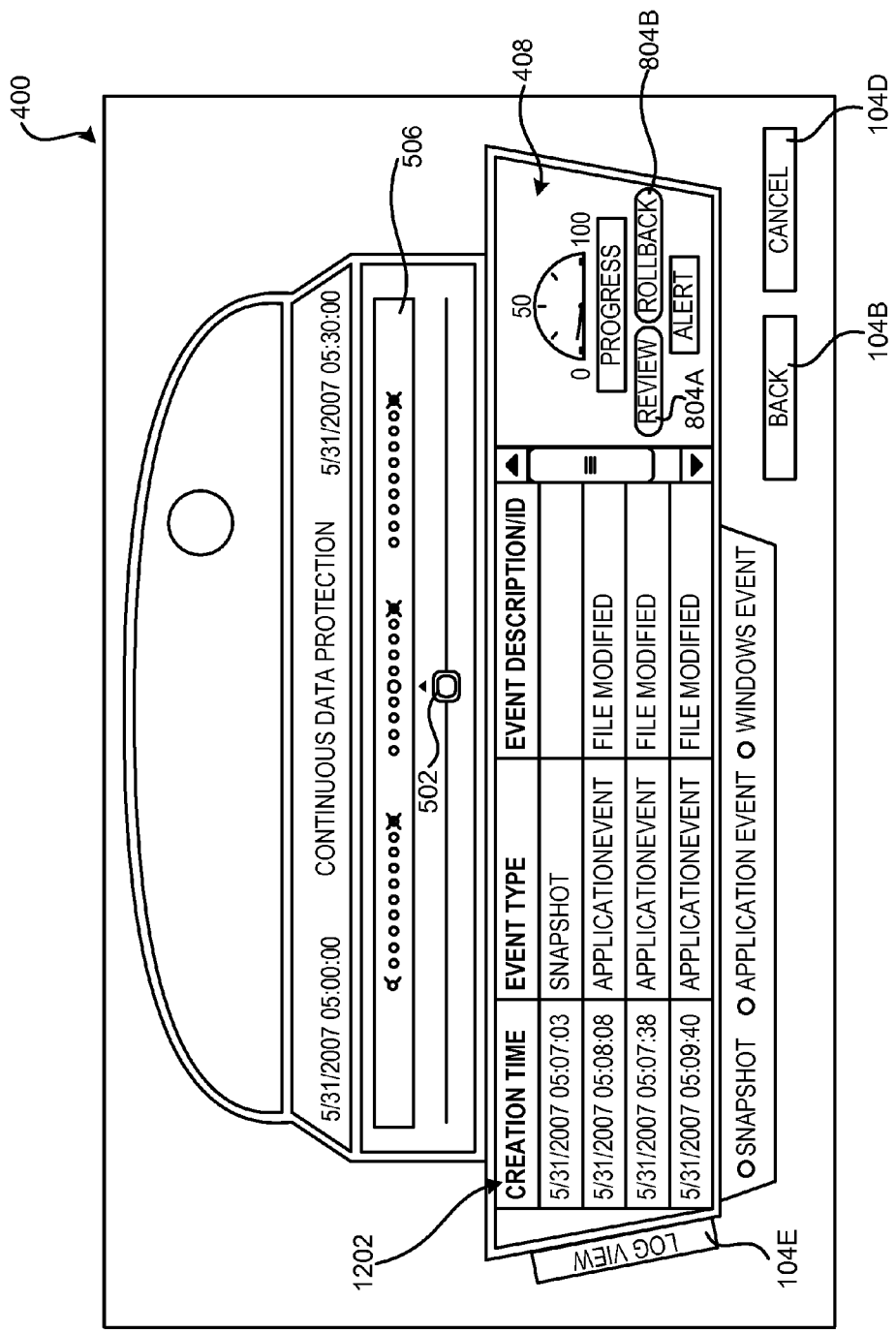
FIGS. 12-13 are user interface diagrams showing an event view of a user interface for specifying the time at which a storage event occurred as the time at which recovery of a storage volume should occur.
Figure 13:
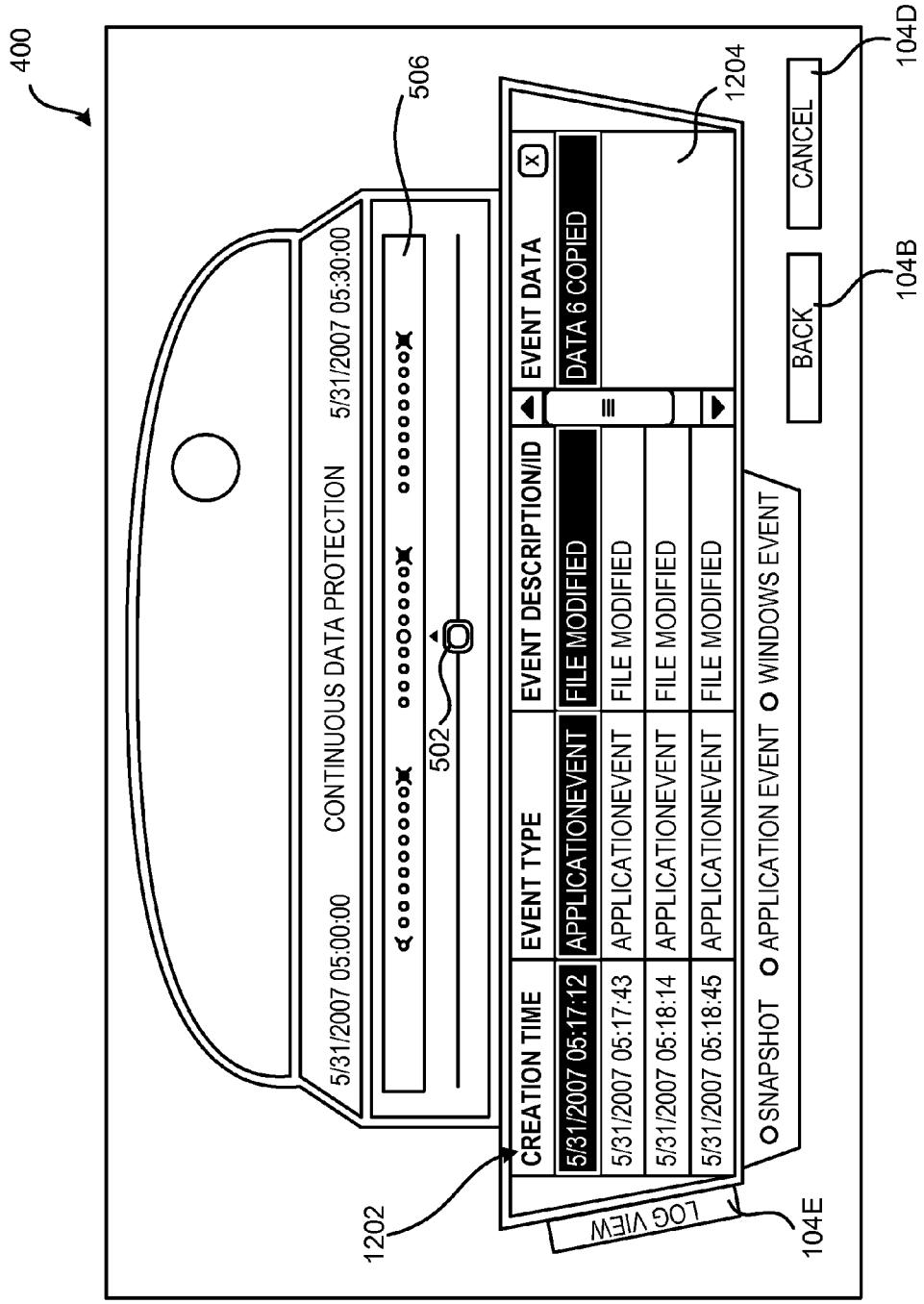

It should be appreciated that the event view illustrated in FIGS. 12-13 enables a user to select one of the events identified in list 1202 and to review or rollback to a point in time identified by that event. For example, in the user interface 400 shown in FIG. 13, a user has selected the first event identified in the list 1202. In response to the selection of the event, data 1204 has been displayed indicating the process that generated the event. Once an event has been selected in this manner, a user may select the buttons 804A-804B to review or rollback the volume to the point of the selected event, respectively. It should be appreciated that a user may return to the log view shown in FIGS. 3-11 by selecting the user interface button 104E.

Figure 14:
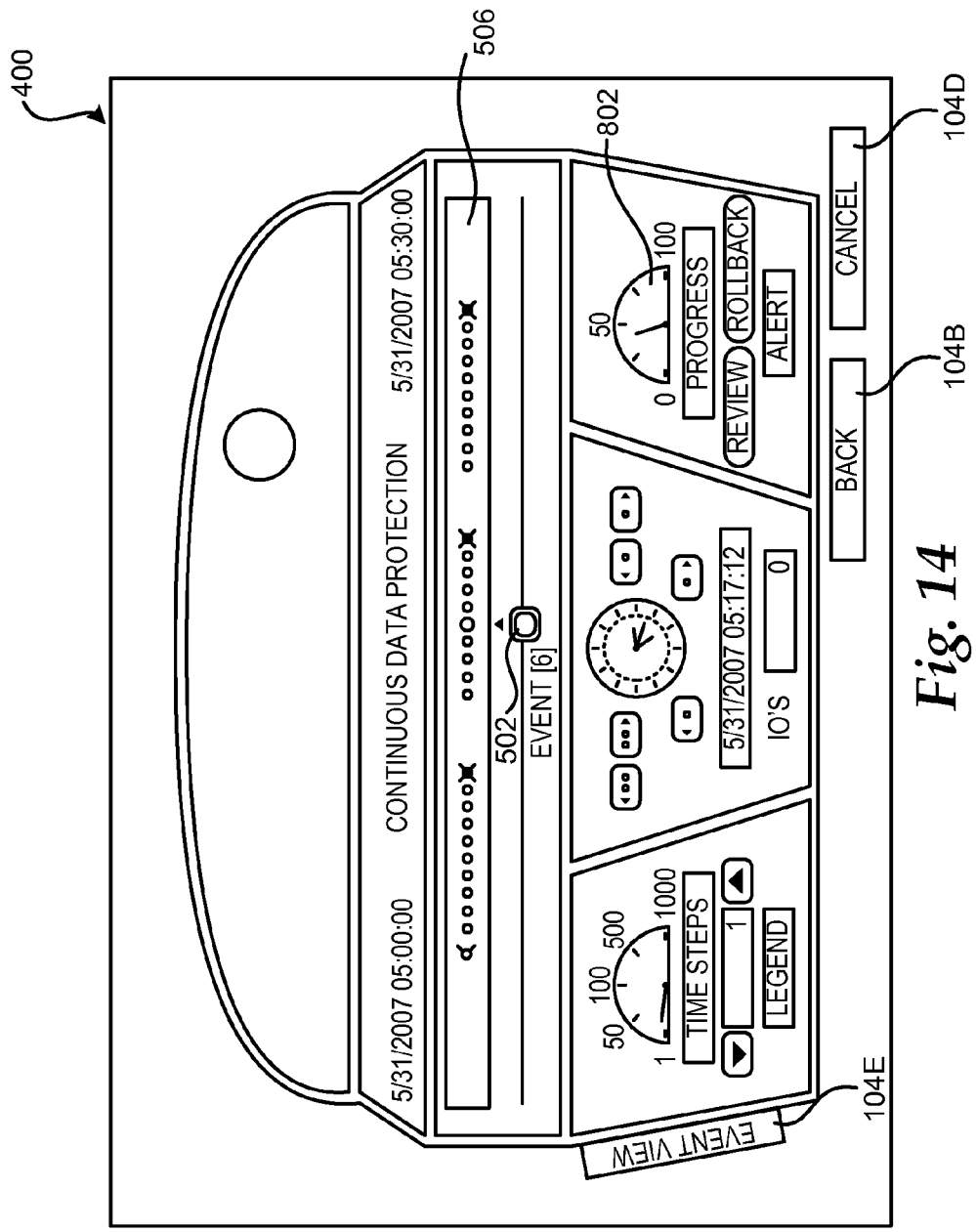
Figure 15:
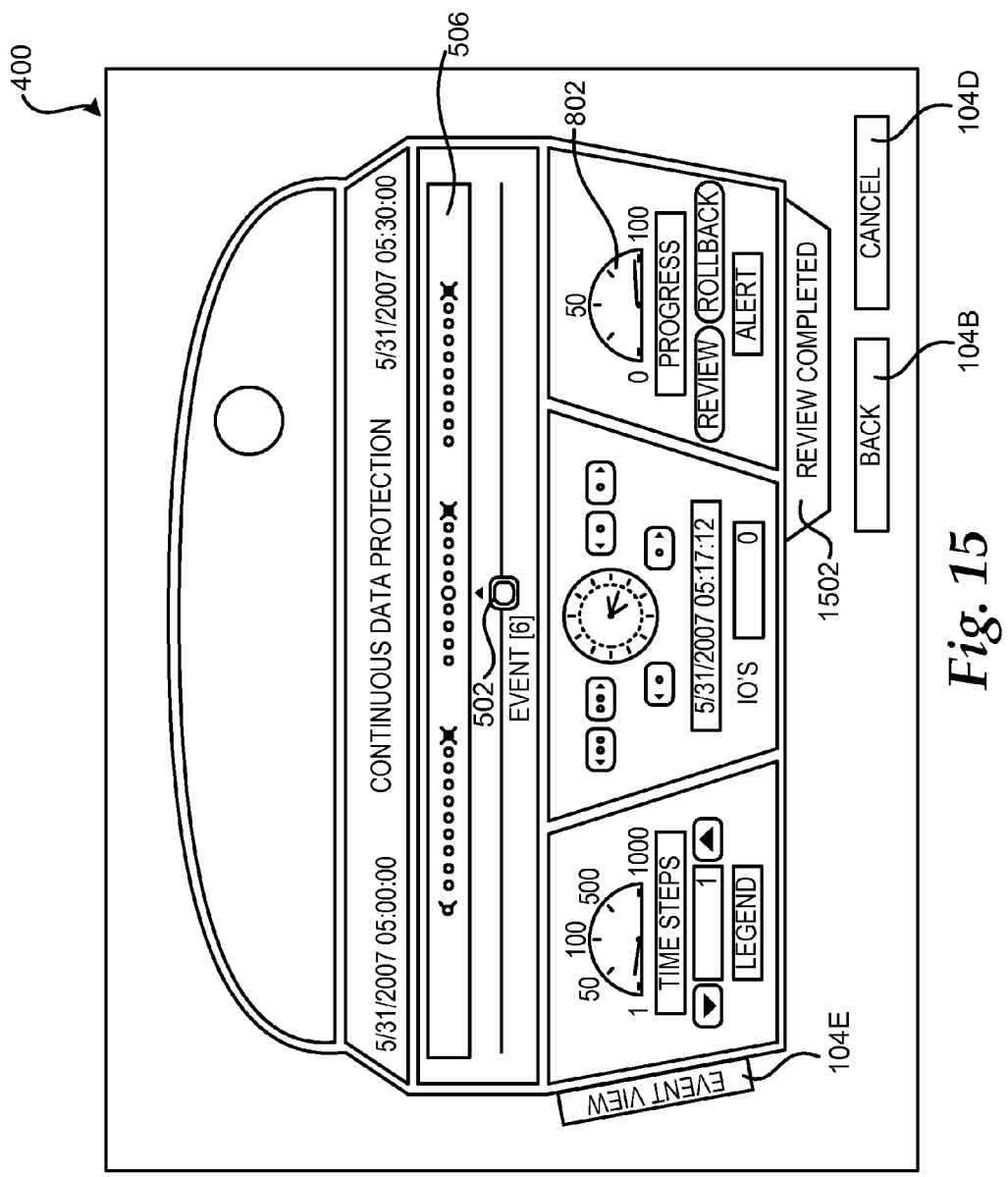

As discussed briefly above, a user may select the user interface buttons 804A-804B to review or rollback a volume to the point in time selected by the slider control 502. In response to such a selection, the progress gauge 802 indicates the progress of the review or rollback operation. Other indications may also be provided to indicate that the review or rollback operation is proceeding. Once the review or rollback operation has completed, the alert indicator 806 is displayed and the status of the review or rollback operation can be obtained by selecting the alert indicator 806. The advancement of the progress gauge 802 is illustrated in FIG. 14.

When a review or rollback operation has been completed, an indicator 1502 may be displayed. Additionally, the progress gauge 802 may indicate a 100% completion. When the review operation has completed, a writeable image of the volume at the time specified using the slider control 502 is provided for use. If a consistency group is being reviewed, a single target with all consistent volumes as a logical unit number is created.

An application server may be connected to the provided image and a consistency check may be performed on the volume to make sure that the image is satisfactory. Once the administrator is satisfied that the volume is appropriate, a rollback operation may be performed on the volume. If an administrator is not satisfied with the review process, another review point may be chosen utilizing the user interface 400 and another review operation may be performed. The review process may be performed as many times as necessary to obtain a satisfactory rollback point.

Figure 16:
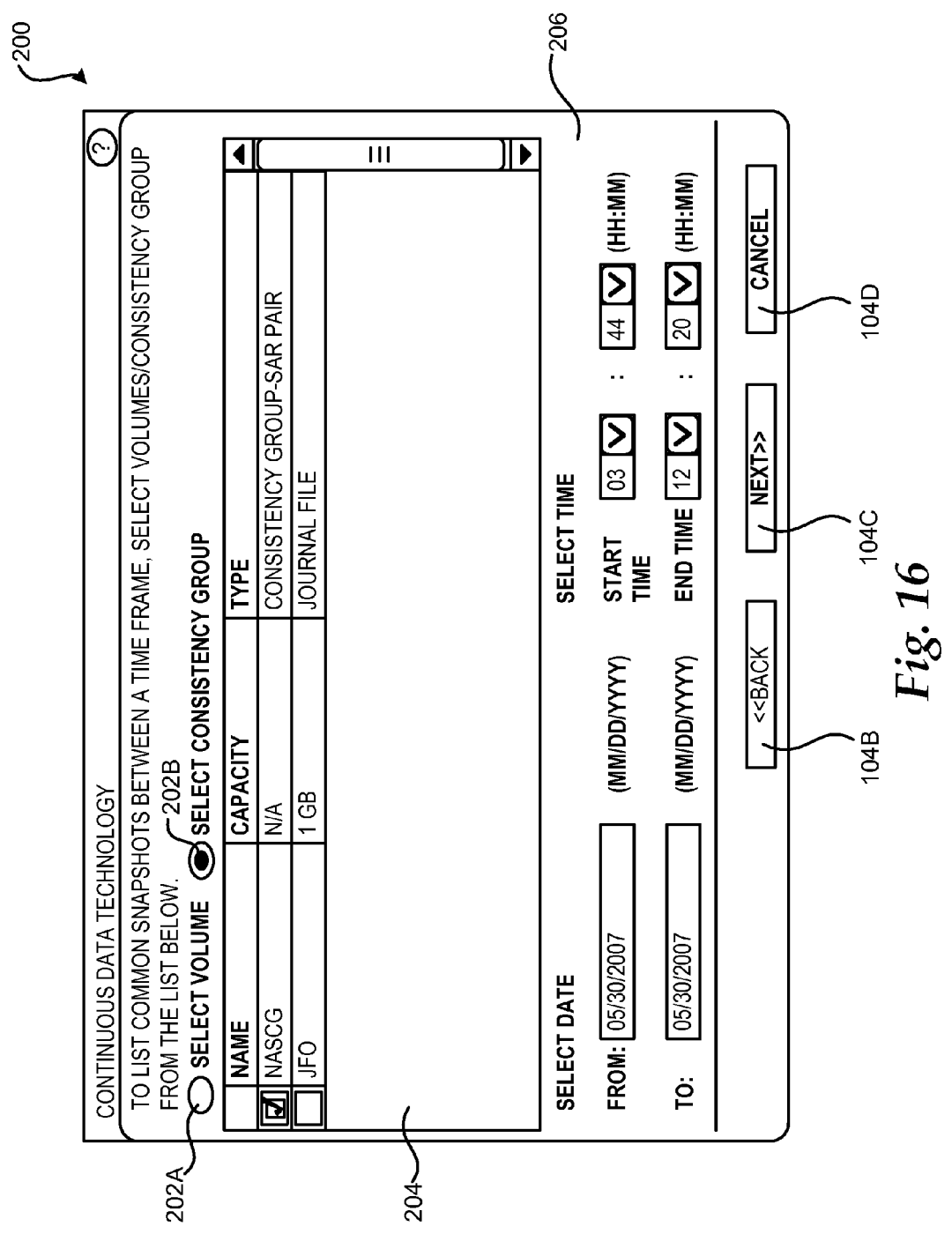

As discussed briefly above, the user interfaces provided herein also include the "retrospect" user interface shown in FIG. 17. The retrospect user interface is utilized to restore individual volume data based upon snapshots. In order to access the retrospect user interface, a consistency group is selected through the user interface 200. For instance, in the example shown in FIG. 16, a consistency group named "NASCG" has been selected. In response to the selection of a consistency group and the selection of the user interface button 104C, the retrospect user interface 1700 shown in FIG. 17 is presented.

As illustrated in FIG. 17, the user interface 1700 provides a graphical representation of the snapshots that have been created for the selected consistency groups. When the user interface 1700 is first displayed, the most recent snapshot is displayed by a graphical representation displayed in the foreground position. Earlier snapshots are represented by graphical representations that are smaller in size, and thereby indicate that they occurred at a previous point in time. For example, in the illustrative user interface 1700 shown in FIG. 17, the representation 1702A is displayed in the most foreground position and has the largest size. The representation 1702B is displayed smaller than the representation 1702A and behind the representation 1702A. Similarly, the representation 1702C is displayed the furthest back and has the smallest size. It should be appreciated that each of the representations 1702A-1702C corresponds to a snapshot and has been displayed in a manner to visually indicate the time at which each of the corresponding snapshots was taken.

As shown in FIG. 17, the user interface 1700 also includes a snapshot list 1704 that displays data regarding the snapshots in a chronologically ordered list. It should be appreciated that the snapshots identified in the snapshot list 1704 are the same snapshots identified by the representations 1702A-1702C.

In one implementation, the representations 1706A-1706B may be utilized to access all of the available snapshots. For instance, in one implementation, the selection of the user interface button 1706A may cause the display of the representations 1702A-1702C to be modified so that a snapshot previous in time is brought to the foreground. Additionally, the list 1704 may also be scrolled in order to display the appropriate snapshots. The user interface button 1706B may be utilized to move the display of the snapshots in the opposite direction. This process is illustrated with respect to FIG. 18.

As shown in the example user interface 1700 illustrated in FIG. 18, a current snapshot is represented by the representation 1702D. Snapshots forward in time from the current snapshot are represented by the representations 1702B-1702C. Snapshots previous in time are represented by the representation 1702E-1702F. In one embodiment, when the user interface buttons 1706A-1706B are selected, the representations 1702 are animated from a current position to a new position. In this manner, the snapshot representations appear to "fly in" from a previous point in time to the current snapshot into the current snapshot position or from the current snapshot position to a time in advance of the current snapshot position.

Once the appropriate snapshot has been moved into the current snapshot position, such as the representation 1702D, the user interface buttons 804A-804B may be selected to either review or rollback the consistency group to the selected snapshot. As discussed above, any number of review operations may be performed prior to a rollback operation. Additionally, the user interface button 104B may be selected to return the user interface display to the user interface 200. Alternatively, the user interface button 104D might be selected to cancel the recovery operation. In the example shown in FIG. 19, a review operation has been performed through the selection of the user interface button 804B. In response thereto, data 1902 has been displayed indicating that the consistency group is ready for review. Additional data may also be provided regarding the status of the review or rollback operations.

While the subject matter described herein has been presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 20:
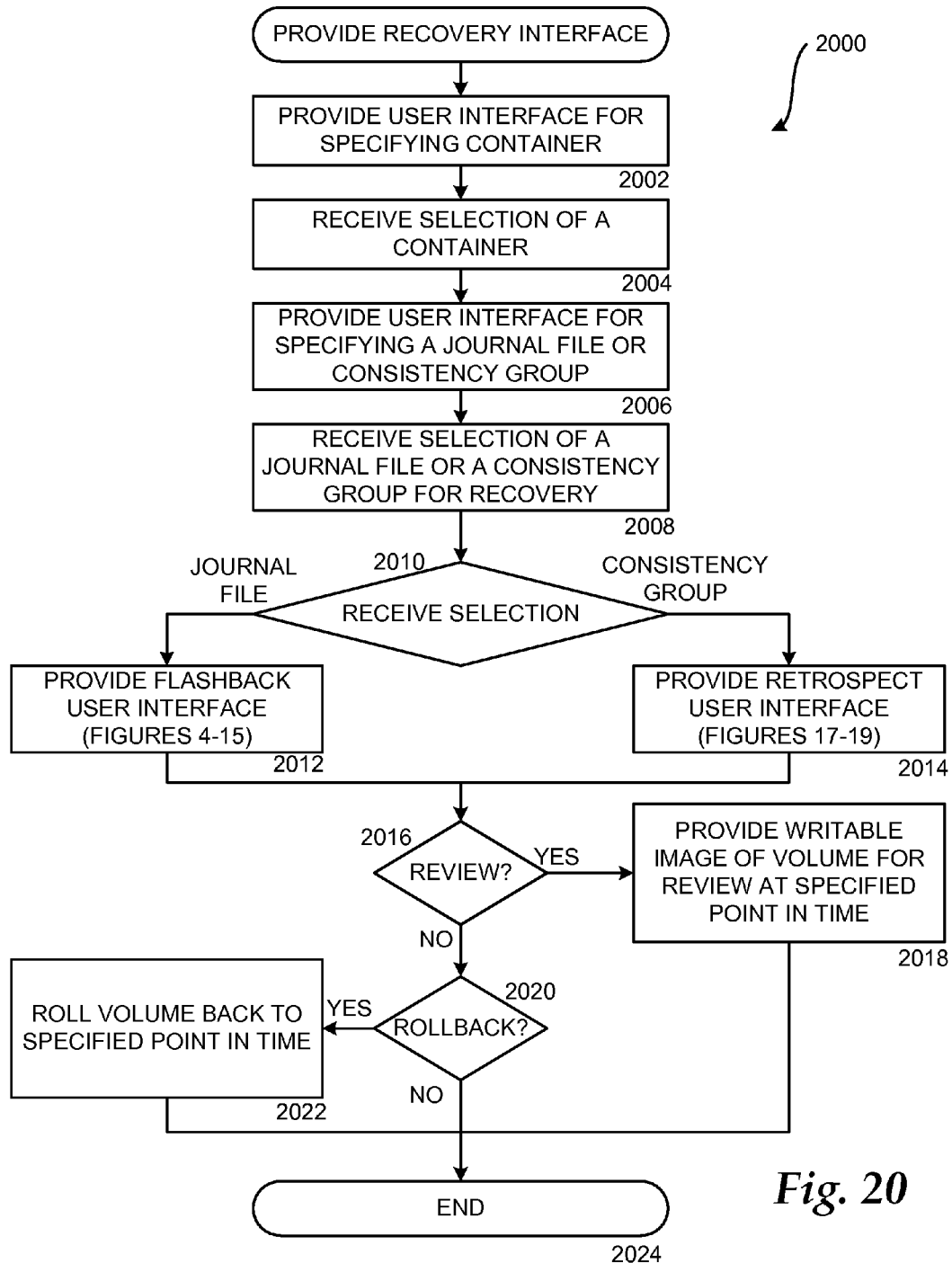
FIG. 20 is a flow diagram showing one illustrative process presented herein for providing a user interface for data recovery.

Turning now to FIG. 20, additional details will be provided regarding the embodiments presented herein for providing a user interface for data recovery. In particular, FIG. 20 is a flow diagram showing a routine 2000 that illustrates aspects of one process for providing the user interfaces described above with respect to FIGS. 1-19, above, according to one exemplary embodiment. It should be appreciated that the process illustrated in FIG. 20 may be provided by executing software components on the computing systems shown in FIGS. 21-22, and described in detail below.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 2000 begins at operation 2002, where a user interface for specifying a container upon which data recovery should be performed is provided. In one embodiment, the user interface 100 shown in FIG. 1 and described above is provided for specifying an appropriate container. An appropriate container is specified utilizing the user interface 100 at operation 2004.

From operation 2004, the routine 2000 proceeds to operation 2006 where an appropriate user interface is provided for specifying a journal file or consistency group upon which data recovery should be performed. An illustrative user interface 200, described above with reference to FIG. 2, is provided in one embodiment for allowing a user to specify a journal file or consistency group. A selection of a journal file or consistency group for recovery is received at operation 2008.

From operation 2008, the routine 2000 proceeds to operation 2010 where a determination is made as to whether a journal file or a consistency group has been selected for recovery. If a journal file has been selected for recovery, the routine 2000 proceeds from operation 2010 to operation 2012, where the user interface 400 described with respect to FIGS. 4-15 is provided. As discussed above, the user interface 400 allows a user to specify the point in time at which recovery should occur. If, at operation 2010, a consistency group is selected, the routine 2000 proceeds to operation 2014. At operation 2014, the user interface 1700, described above with respect to FIGS. 17-19, is provided through which a user can specify a snapshot of the consistency group for restoration.

From operations 2012 and 2014, the routine 2000 proceeds to operation 2016. At operation 2016, a determination is made as to whether a user has requested to review the results of a rollback operation prior to actually rolling back the volume data. If so, the routine 2000 proceeds to operation 2018 where a writeable image of the volume is provided for review at the specified point in time. If, at operation 2016, it is determined that a user has not requested to review a data recovery operation, the routine 2000 proceeds to operation 2020. At operation 2020, a determination is made as to whether a user has requested to rollback to a particular point in time specified through the user interfaces 400 or 1700. If so, the routine 2000 proceeds to operation 2022, where the volume is rolled back to the specified point in time. If a user has not requested to roll back, the routine 2000 proceeds to operation 2024, where it ends. The routine 2000 also proceeds to operation 2024 from the operations 2022 and 2018.

Figure 21:
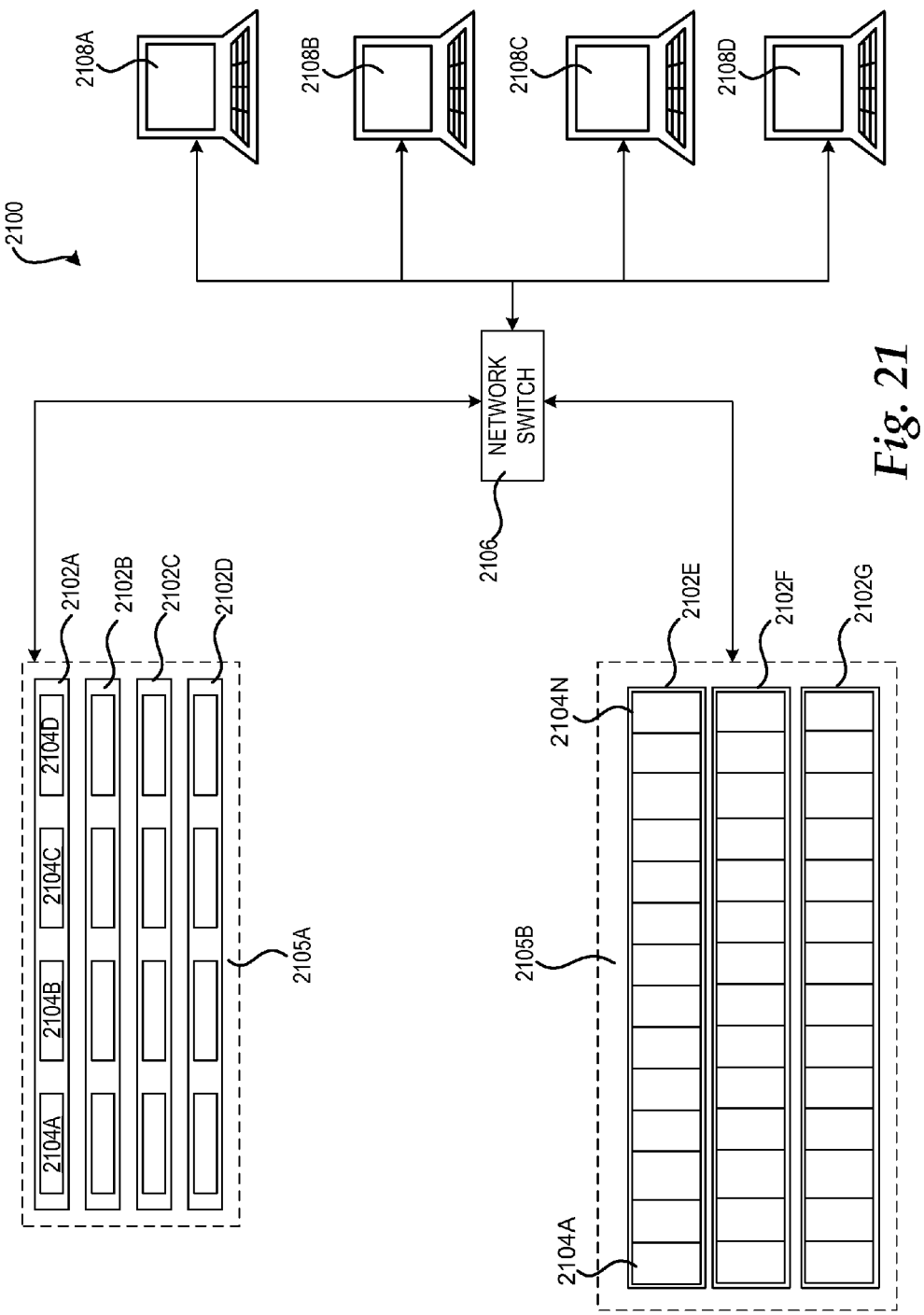
FIG. 21 is a network diagram showing one illustrative operating environment for the embodiments presented herein.

Turning now to FIG. 21, details will be provided regarding an illustrative operating environment for the implementations presented herein. In particular, FIG. 21 shows a network architecture diagram showing aspects of a storage system that enables CDP through the use of a journaling module, snapshots, containers, and consistency groups, and that provides the UI described above for data recovery. It should be appreciated that the architecture shown in FIG. 21 is merely illustrative and that other storage systems providing CDP functionality may be utilized to implement the embodiments presented herein.

The illustrative storage system illustrated in FIG. 21 includes several virtualized clusters 2105A-2105B. A virtualized cluster is a cluster of different storage nodes that together expose a single storage device. In the example storage system 2100 shown in FIG. 21, the clusters 2105A-2105B include the storage server computers 2102A-2102G (also referred to herein as "storage nodes" or a "node") that are operative to read and write data to one or more mass storage devices, such as hard disk drives. The cluster 2105A includes the nodes 2102A-2102D and the cluster 2105B includes the nodes 2102E-2102G.

According to implementations, the nodes within a cluster may be housed in a one rack space unit storing up to four hard disk drives. For instance, the node 2102A is a one rack space computing system that includes four hard disk drives 2104A-2104D. Alternatively, each node may be housed in a three rack space unit storing up to fifteen hard disk drives. For instance, the node 2102E includes fifteen hard disk drives 2104A-2104N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown, multiple storage nodes may be configured together as a virtualized storage cluster. For instance, the nodes 2102A-2102D have been configured as a storage cluster 2105A and the nodes 2102E-2102G have been configured as a storage cluster 2105B. In this configuration, each of the storage nodes 2102A-2102G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 2105A may stripe data across the storage nodes 2102A, 2102B, 2102C, and 2102D. The cluster 2105B may similarly stripe data across the storage nodes 2102E, 2102F, and 2102G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2102A-2102G includes one or more network ports operatively connected to a network switch 2106 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2102A-2102G is a part. Through the use of the network ports and other appropriate network cabling and equipment, each node within a cluster is communicatively connected to the other nodes within the cluster. Many different types and number of connections may be made between the nodes of each cluster.

Each cluster 2105A-2105B is also connected to a network switch 2106. The network switch 2106 is connected to one or more client computers 2108A-2108N (also referred to herein as "initiators"). It should be appreciated that other types of networking topologies may be utilized to interconnect the clients and the clusters 2105A-2105B. It should also be appreciated that the initiators 2108A-2108N may be connected to the same local area network ("LAN") as the clusters 2105A-2105B or may be connected to the clusters 2105A-2105B via a distributed wide area network, such as the Internet. An appropriate protocol, such as the Internet Small Computer Systems Interface ("iSCSI") protocol may be utilized to enable the initiators 2108A-2108D to communicate with and utilize the various functions of the storage clusters 2105A-2105B over a wide area network such as the Internet. As discussed above, the storage clusters 2105A-2105B may provide the functionality presented herein for CDP, including journaling, snapshots, containers, consistency groups, and the user interfaces described above with respect to FIGS. 1-20.

Figure 22:
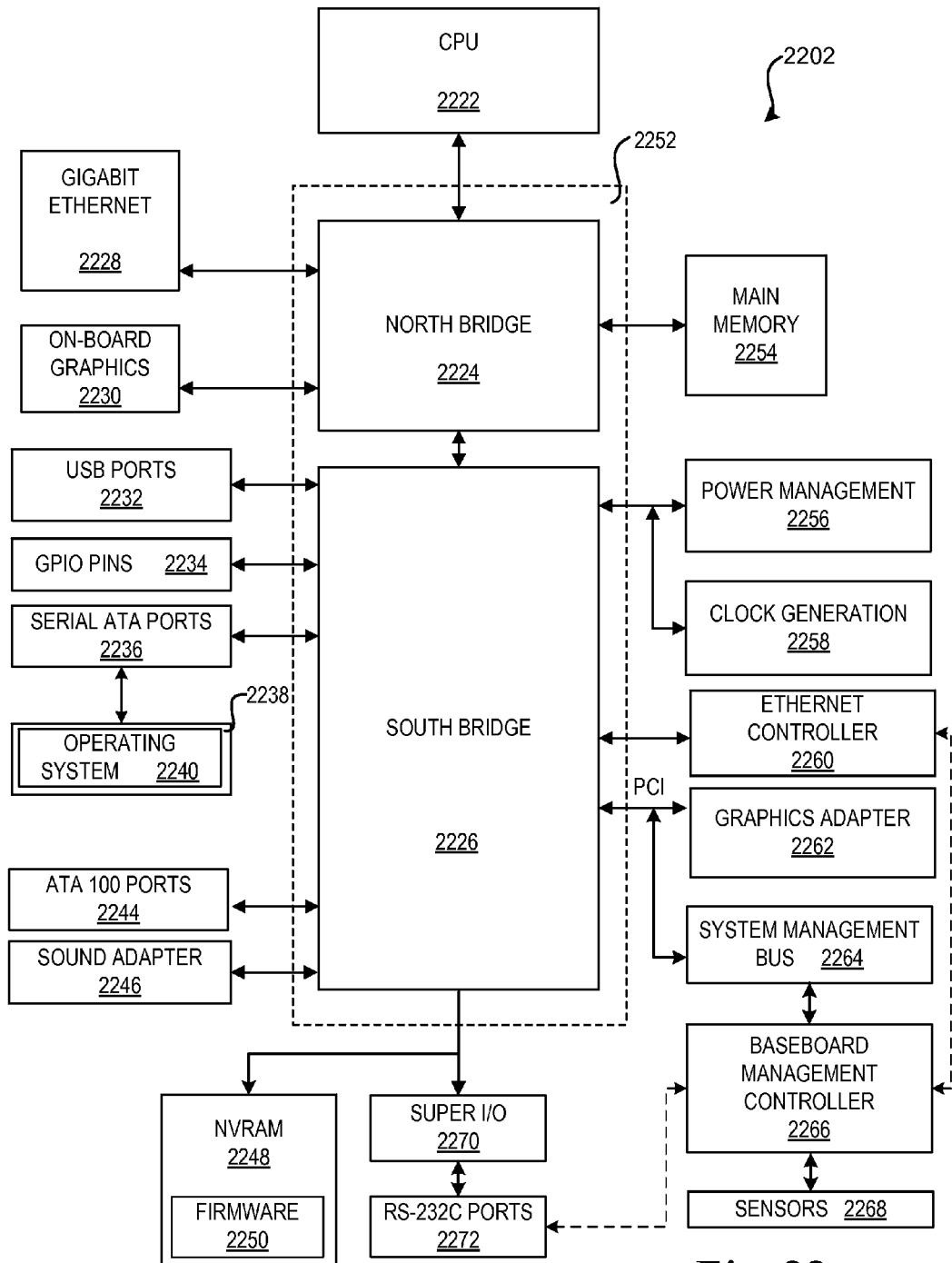
FIG. 22 is a computer architecture diagram illustrating a computer hardware architecture for a computing system capable of embodying aspects of the concepts and technologies presented herein.

FIG. 22 and the following discussion are intended to provide a brief, general description of a computer architecture for a computer 2202 for executing any of the various software components described herein. The computer architecture shown in FIG. 22 may be utilized to embody any of the nodes 2102, described above. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

FIG. 22 shows an illustrative computer architecture for a computer 2202 that may be utilized to embody the technologies described herein. The computer 2202 includes a baseboard, or "motherboard", which is a printed circuit board to which a multitude of components or devices may be connected by way of a system bus or other electrical communication path. In one illustrative embodiment, a CPU 2222 operates in conjunction with a chipset 2252. The CPU 2222 is a standard central processor that performs arithmetic and logical operations necessary for the operation of the computer. The computer 2202 may include a multitude of CPUs 2222.

The chipset 2252 includes a north bridge 2224 and a south bridge 2226. The north bridge 2224 provides an interface between the CPU 2222 and the remainder of the computer 2202. The north bridge 2224 also provides an interface to a random access memory ("RAM") used as the main memory 2254 in the computer 2202 and, possibly, to an on-board graphics adapter 2230. The north bridge 2224 may also include functionality for providing networking functionality through a gigabit Ethernet adapter 2228. The gigabit Ethernet adapter 2228 is capable of connecting the computer 2202 to another computer via a network. Connections that may be made by the network adapter 2228 may include LAN or WAN connections. LAN and WAN networking environments are commonplace in offices, enterprise-wide computer networks, intranets, and the Internet. The north bridge 2224 is connected to the south bridge 2226.

The south bridge 2226 is responsible for controlling many of the input/output functions of the computer 2202. In particular, the south bridge 2226 may provide one or more universal serial bus ("USB") ports 2232, a sound adapter 2246, an Ethernet controller 2260, and one or more general-purpose input/output ("GPIO") pins 2234. The south bridge 2226 may also provide a bus for interfacing peripheral card devices such as a graphics adapter 2262. In one embodiment, the bus comprises a peripheral component interconnect ("PCI") bus. The south bridge 2226 may also provide a system management bus 2264 for use in managing the various components of the computer 2220. Additional details regarding the operation of the system management bus 2264 and its connected components are provided below.

The south bridge 2226 is also operative to provide one or more interfaces for connecting mass storage devices to the computer 2202. For instance, according to an embodiment, the south bridge 2226 includes a serial advanced technology attachment ("SATA") adapter for providing one or more serial ATA ports 2236 and an ATA 100 adapter for providing one or more ATA 100 ports 2244. The serial ATA ports 2236 and the ATA 100 ports 2244 may be, in turn, connected to one or more mass storage devices such as the SATA disk drive 38 for storing an operating system 2240 and programs for implementing the functionality presented herein, such as a journaling module and a module for providing the user interfaces described above. As known to those skilled in the art, an operating system 2240 comprises a set of programs that control operations of a computer and allocation of resources. A module is software that runs on top of the operating system software, or other runtime environment, and uses computer resources to perform application specific tasks desired by a user.

According to one embodiment presented herein, the operating system 2240 comprises the LINUX operating system. According to another embodiment, the operating system 2240 comprises the WINDOWS SERVER operating system from MICROSOFT CORPORATION. According to another embodiment, the operating system 2240 comprises the UNIX or SOLARIS operating system. It should be appreciated that other operating systems may also be utilized.

The mass storage devices connected to the south bridge 2226, and their associated computer-readable media, provide non-volatile storage for the computer 2220. Although the description of computer-readable media contained herein refers to a mass storage device, such as a hard disk or CD-ROM drive, it should be appreciated by those skilled in the art that computer-readable media can be any available media that can be accessed by the computer 2220. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 2226 for connecting a "Super I/O" device 2270. The Super I/O device 2270 is responsible for providing a number of input/output ports, including a keyboard port, a mouse port, a serial interface 2272, a parallel port, and other types of input/output ports. The LPC interface may also connect a computer storage media such as a ROM or a flash memory such as a NVRAM 2248 for storing the firmware 2250 that includes program code containing the basic routines that help to start up the computer 2202 and to transfer information between elements within the computer 2202.

As described briefly above, the south bridge 2226 may include a system management bus 2264. The system management bus 2264 may include a BMC 2266. In general, the BMC 2266 is a microcontroller that monitors operation of the computer system 2202. In a more specific embodiment, the BMC 2266 monitors health-related aspects associated with the computer system 2202, such as, but not limited to, the temperature of one or more components of the computer system 2202, speed of rotational components (e.g., spindle motor, CPU Fan, etc.) within the system, the voltage across or applied to one or more components within the system 2202, and the available or used capacity of memory devices within the computer 2202.

The BMC 2266 is communicatively connected to one or more components by way of the management bus 2264. In an embodiment, these components include sensor devices for measuring various operating and performance-related parameters within the computer system 2202. The sensor devices may be either hardware or software based components configured or programmed to measure or detect one or more of the various operating and performance-related parameters. The BMC 2266 functions as the master on the management bus 2264 in most circumstances, but may also function as either a master or a slave in other circumstances. Each of the various components communicatively connected to the BMC 2266 by way of the management bus 2264 is addressed using a slave address. The management bus 2264 is used by the BMC 2266 to request and/or receive various operating and performance-related parameters from one or more components, which are also communicatively connected to the management bus 2264.

It should be appreciated that the architecture shown in FIG. 22 is merely illustrative and that the computer 2202 may comprise other types of computing devices, including handheld computers, embedded computer systems, personal digital assistants, and other types of computing devices known to those skilled in the art. It is also contemplated that the computer 2202 may not include all of the components shown in FIG. 22, may include other components that are not explicitly shown in FIG. 22, or may utilize an architecture completely different than that shown in FIG. 22.

Based on the foregoing, it should be appreciated that technologies for providing user interfaces for data recovery are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereon which, when executed by a computer, will cause the computer to:
provide a first user interface through which a user may specify a container for recovery;
in response to the specification of a container for recovery through the first user interface, to provide a second user interface through which a user may specify a consistency group or journal file to be used for recovery;
in response to receiving the selection of a journal file through the second user interface, to provide a third user interface through which a user may specify a point or event in time at which recovery should occur; and
in response to receiving the selection of a consistency group through the second user interface, to provide a fourth user interface through which a user may specify a snapshot across two or more volumes of the consistency group that should be utilized for recovery.

2. The non-transitory computer-readable storage medium of claim 1, wherein the second user interface comprises a first user interface control for graphically representing the time at which one or more events identified in the journal file occurred and for selecting the time of one of the events as the time at which recovery should occur.

3. The non-transitory computer-readable storage medium of claim 2, wherein the first user interface control is further configured to graphically represent the time at which one or more snapshots identified in the journal file occurred and for selecting the time of one of the snapshots as the time at which recovery should occur.

4. The non-transitory computer-readable storage medium of claim 3, wherein the first user interface control is further configured to provide functionality for selecting the time at which recovery should occur in discrete time units.

5. The non-transitory computer-readable storage medium of claim 4, wherein the second user interface comprises a second user interface control for changing the time, event, or snapshot at which recovery should occur in discrete time units.

6. The non-transitory computer-readable storage medium of claim 5, wherein the second user interface comprises a third user interface control for changing the discrete time units.

7. The non-transitory computer-readable storage medium of claim 6, wherein the second user interface comprises a fourth user interface control for receiving a request to perform recovery and for graphically illustrating the progress of a recovery operation.

8. The non-transitory computer-readable storage medium of claim 7, wherein the third user interface is further configured to provide a second view for specifying the time of an event as the time at which recovery should occur.

9. The non-transitory computer-readable storage medium of claim 8, wherein an event comprises a snapshot, an application event, or an operating system event.

10. The non-transitory computer-readable storage medium of claim 9, wherein the second view is further configured to receive a request to perform recovery and for graphically illustrating the progress of a recovery operation.

11. The non-transitory computer-readable storage medium of claim 10, wherein the fourth user interface comprises a user interface control configured to display a graphical representation of one or more snapshots available for the consistency group, each graphical representation sized according to the time at which the corresponding snapshot was created.

12. The non-transitory computer-readable storage medium of claim 11, wherein each graphical representation is selectable to specify the time of a corresponding snapshot for recovery.

13. A computing system configured for providing a user interface for data recovery, the computing system comprising:
a hardware processor; and
a memory in communication with the hardware processor, the memory having computer-executable instructions stored thereon that, when executed by the hardware processor, cause the hardware processor to provide a user interface through which a user may specify a consistency group or journal file to be used for recovery, to provide a second user interface through which a user may specify a point in time or event at which recovery should occur in response to receiving the selection of a journal file through the first user interface, and to provide a third user interface through which a user may specify a snapshot that should be utilized for recovery in response to receiving the selection of a consistency group through the first user interface.

14. The computing system of claim 13, wherein the second user interface is configured to provide a second view for specifying the time of an event as the time at which recovery should occur.

15. The computing system of claim 14, wherein the third user interface comprises a user interface control configured to display a graphical representation of one or more snapshots available for the consistency group, each graphical representation sized according to the time at which the corresponding snapshot was created.

16. The computing system of claim 15, wherein each graphical representation is selectable to specify the time of a corresponding snapshot for recovery.

17. A computer-implemented method for providing a user interface for data recovery, the method comprising performing computer-implemented operations for:
providing a first user interface through which a user may specify a consistency group or journal file to be used for recovery;
in response to receiving the selection of a journal file through the first user interface, transforming the contents of the journal file to provide a second user interface through which a user may specify a point or event in time at which recovery should occur; and
in response to receiving the selection of a consistency group through the first user interface, transforming data identifying one or more available snapshots for the consistency group to provide a third user interface through which a user may specify a snapshot that should be utilized for recovery.

18. The method of claim 17, wherein the second user interface is configured to provide a view for specifying the time of an event as the time at which recovery should occur.

19. The method of claim 18, wherein the third user interface comprises a user interface control configured to display a graphical representation of one or more snapshots available for the consistency group, each graphical representation sized according to the time at which the corresponding snapshot was created.

20. The method of claim 19, wherein each graphical representation is selectable to specify the time of a corresponding snapshot for recovery.

* * * * *